(12) United States Patent
Overman et al.

(10) Patent No.: US 12,338,774 B1
(45) Date of Patent: Jun. 24, 2025

(54) FUEL INJECTOR MANIFOLD HAVING A VARIABLE FUEL FLOW SYSTEM FOR A TURBINE ENGINE

(71) Applicant: General Electric Company, Schenectady, NY (US)

(72) Inventors: Nicholas R. Overman, Sharonville, OH (US); William David Magnuszewski, Cincinnati, OH (US); Rachel Yu, Medford, MA (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/633,110

(22) Filed: Apr. 11, 2024

(51) Int. Cl.
*F02C 7/22* (2006.01)
*F23R 3/28* (2006.01)

(52) U.S. Cl.
CPC .............. *F02C 7/222* (2013.01); *F23R 3/28* (2013.01)

(58) Field of Classification Search
CPC .................................. F02C 7/22; F02C 7/222
See application file for complete search history.

(56) References Cited

U.S. PATENT DOCUMENTS

| | | |
|---|---|---|
| 4,022,165 A | 5/1977 | Eckert et al. |
| 5,390,498 A * | 2/1995 | Sulkin ............... F02C 7/232 60/764 |
| 5,664,412 A | 9/1997 | Overton |
| 5,771,696 A | 6/1998 | Hansel et al. |
| 7,533,531 B2 | 5/2009 | Prociw et al. |
| 7,703,286 B2 | 4/2010 | Morenko et al. |
| 7,703,289 B2 | 4/2010 | Rudrapatna et al. |
| 7,743,612 B2 | 6/2010 | Morenko |
| 9,416,975 B2 | 8/2016 | Myers |
| 10,197,027 B2 | 2/2019 | Kalenborn |
| 11,815,025 B2 | 11/2023 | Overman |
| 2015/0315969 A1* | 11/2015 | Fisher ............... F23R 3/28 60/739 |
| 2020/0300472 A1* | 9/2020 | Rodrigues ............... F02C 7/232 |
| 2022/0356846 A1 | 11/2022 | Overman |

* cited by examiner

*Primary Examiner* — William H Rodriguez
(74) *Attorney, Agent, or Firm* — Venable LLP; Andrew W. Bradshaw; Michele V. Frank

(57) ABSTRACT

A fuel injector manifold for a turbine engine includes a fuel manifold ring, a plurality of fuel injectors, and a variable fuel flow system. The fuel manifold flowpath within the fuel manifold ring, the fuel manifold flowpath receiving fuel therein. The plurality of fuel injectors in fluid communication with the fuel manifold flowpath, each of the plurality of fuel injectors having one or more fuel injector flowpaths. The variable fuel flow system disposed within the fuel manifold flowpath, the variable fuel flow system including a closed state, a partially opened state, and a fully opened state to vary a flow of the fuel from the fuel manifold flowpath to the one or more fuel injector flowpaths of each of the plurality of fuel injectors.

20 Claims, 25 Drawing Sheets

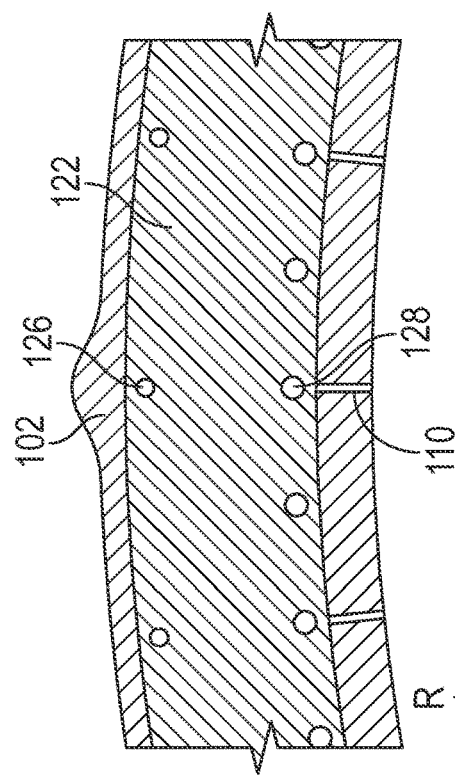
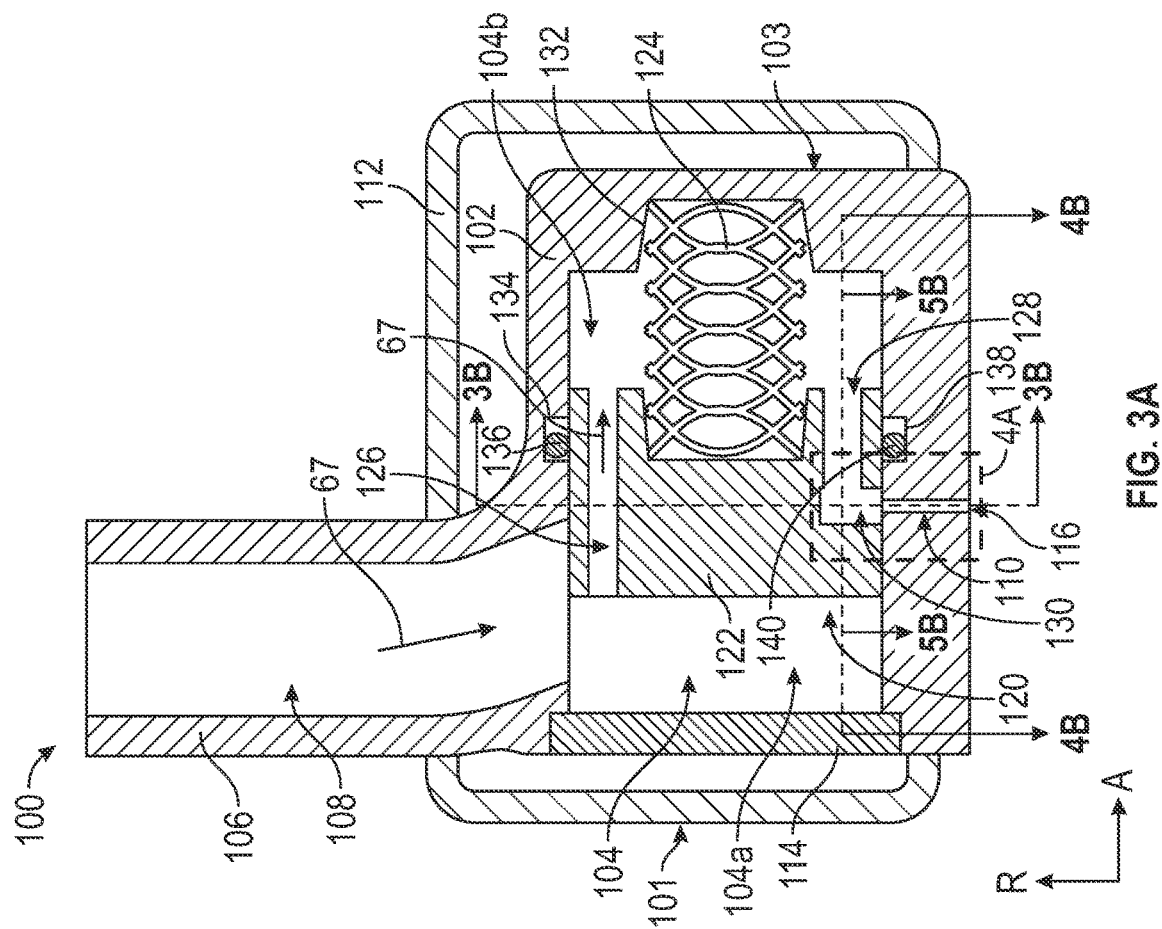
FIG. 3B
FIG. 3A

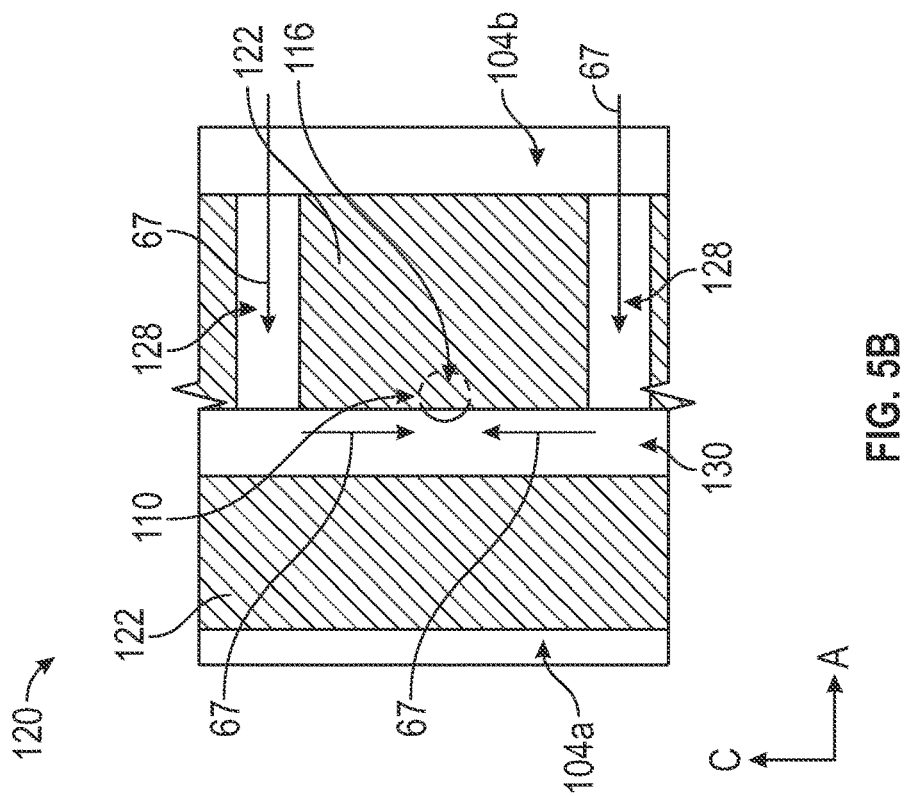
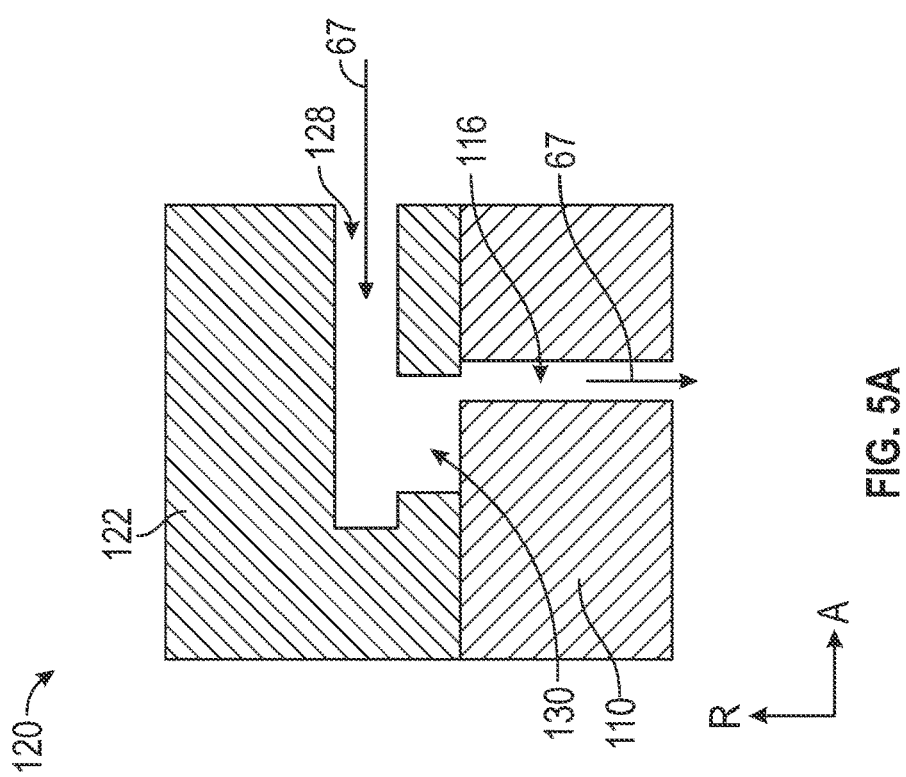

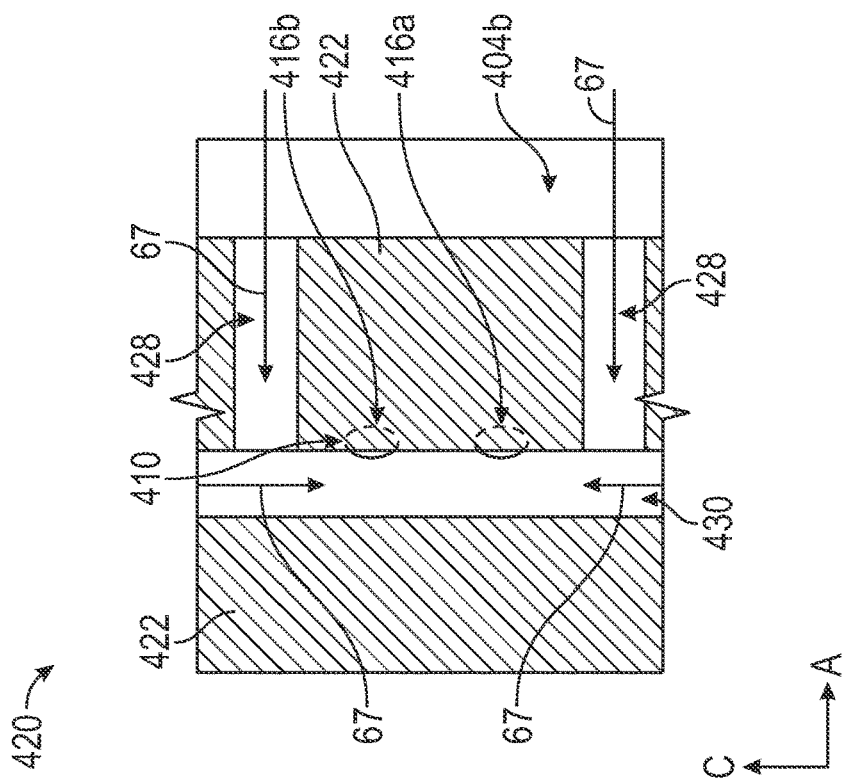
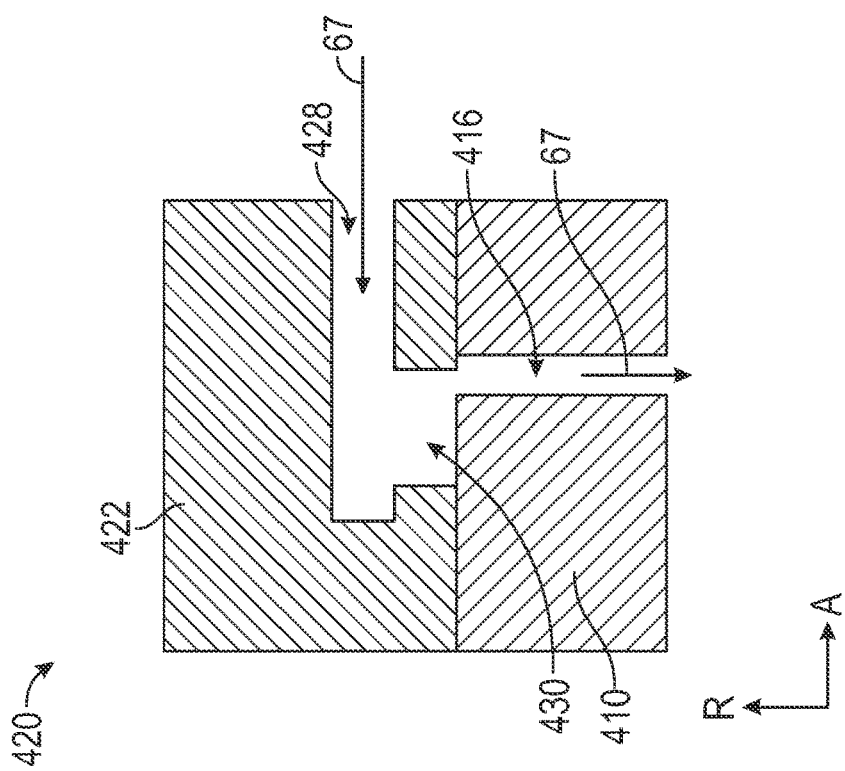
FIG. 11B
FIG. 11A

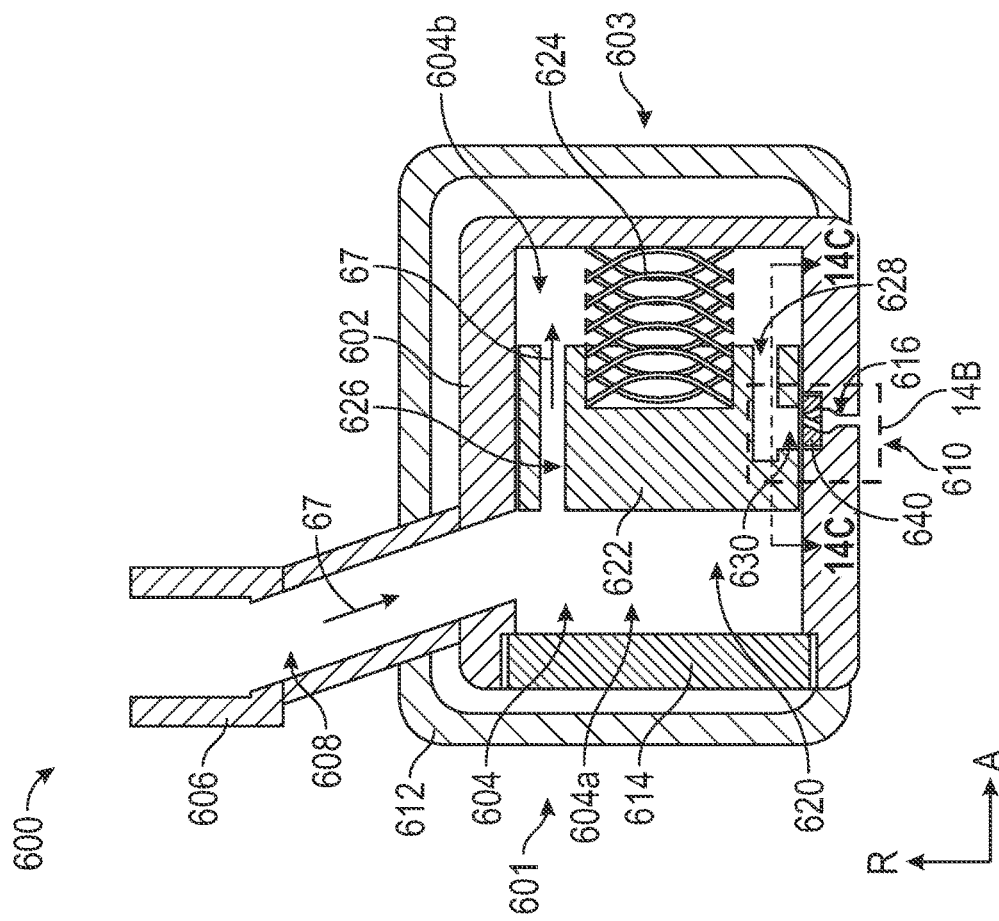
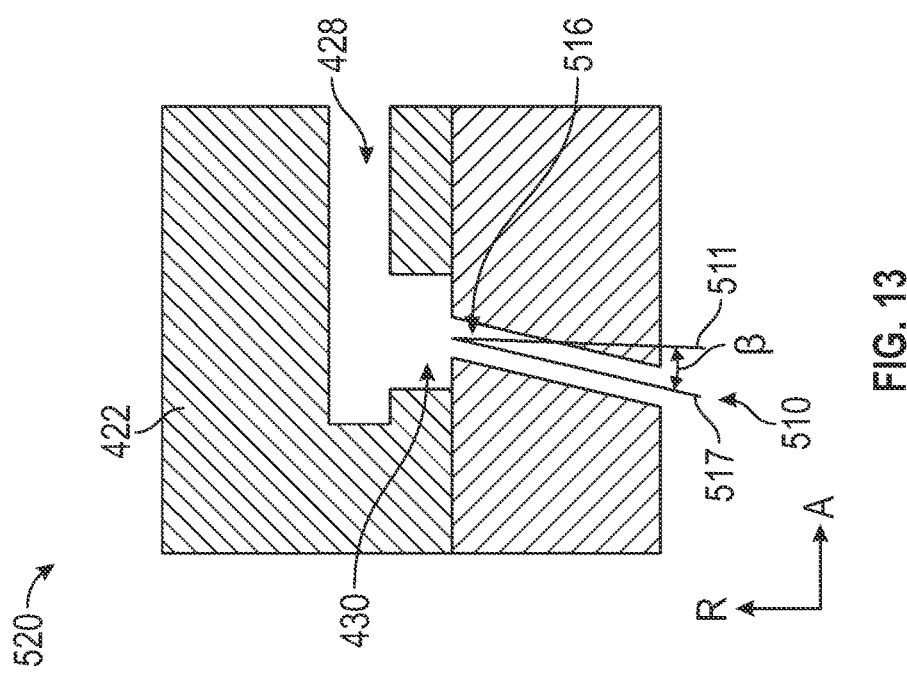
FIG. 14A
FIG. 13

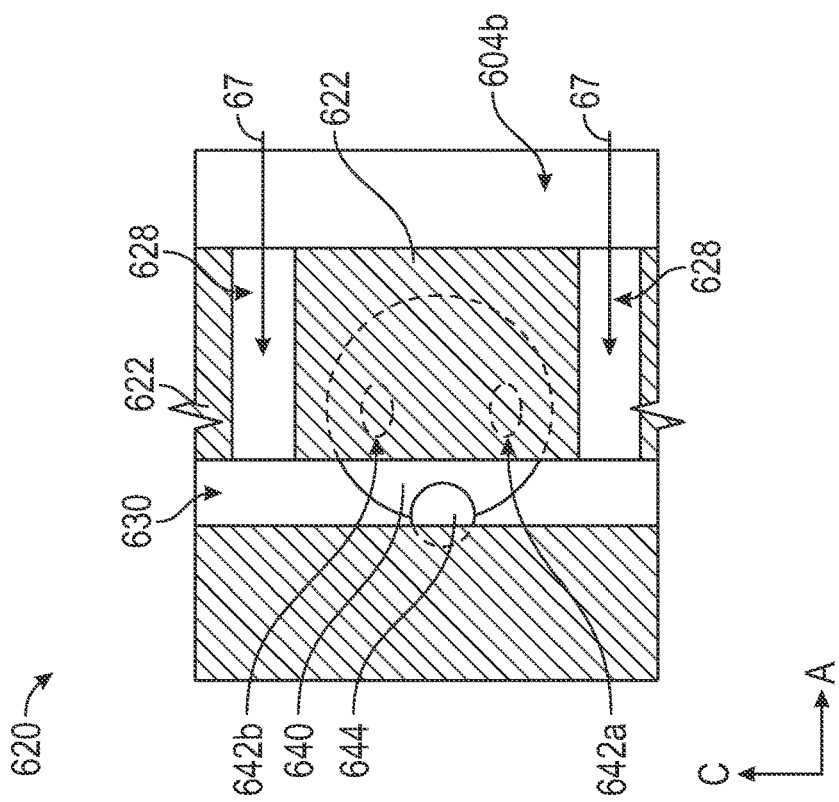
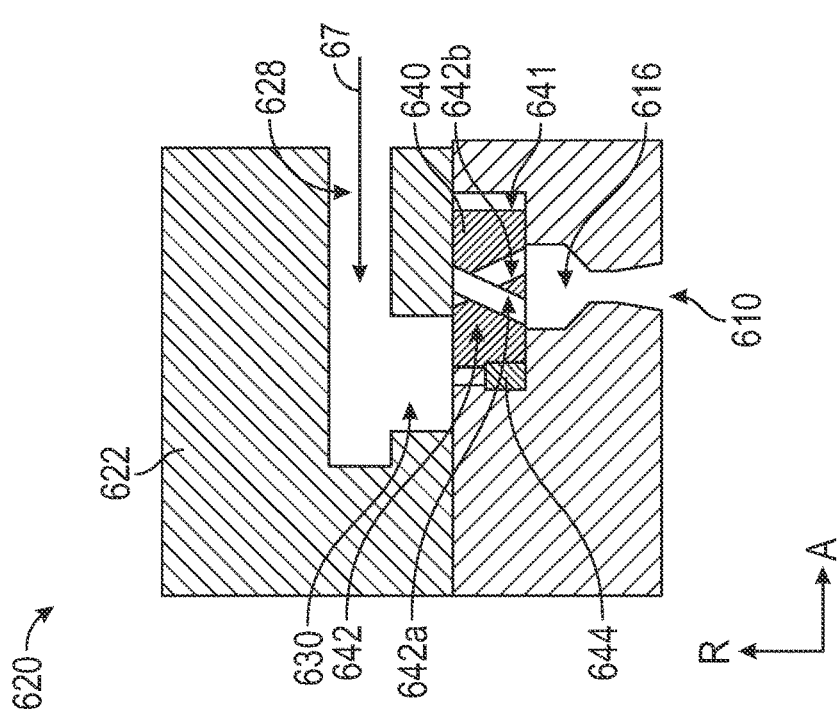
FIG. 15B
FIG. 15A

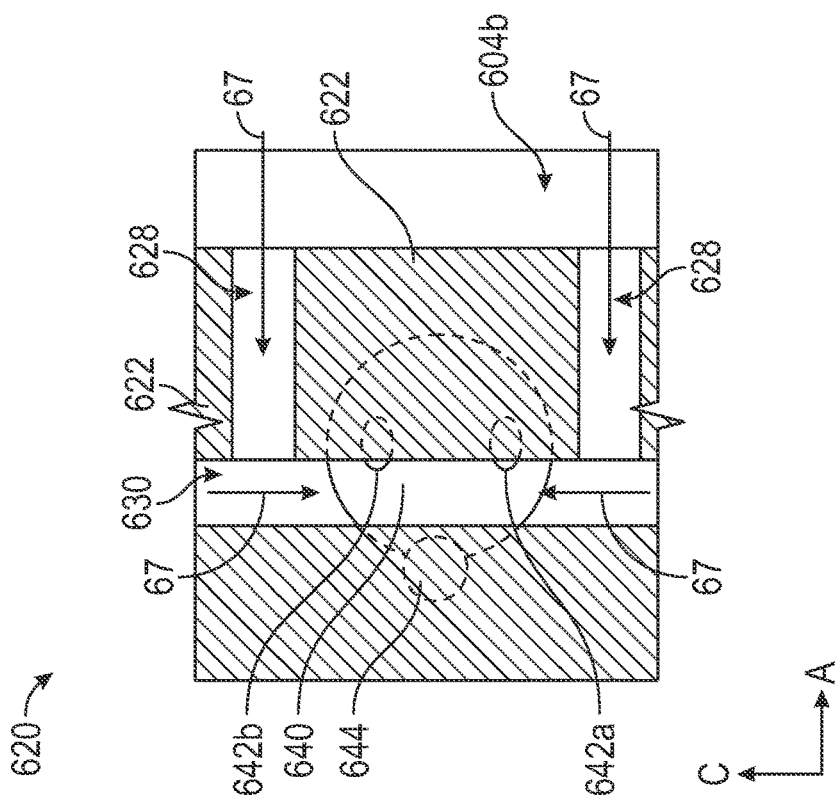
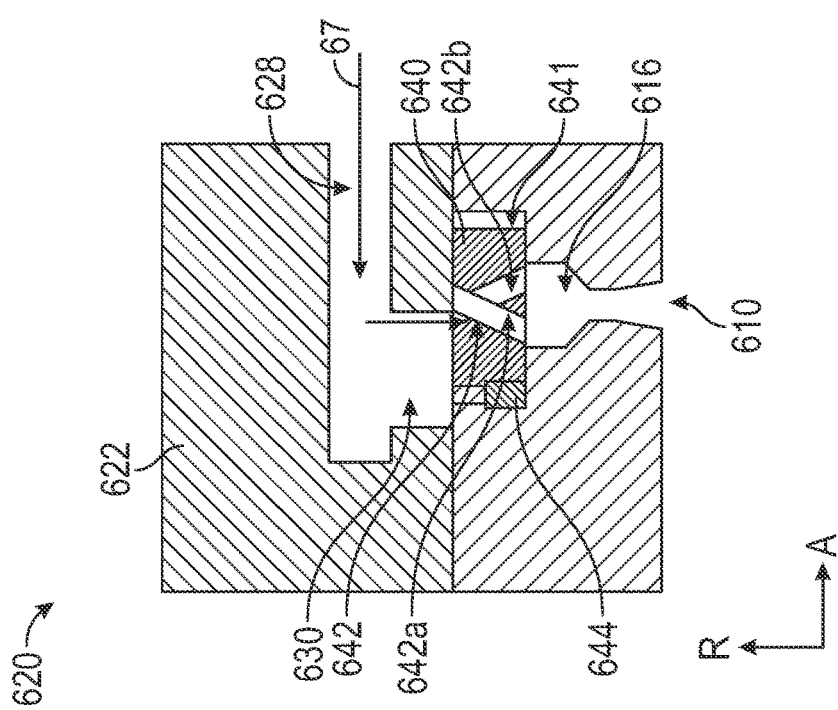
FIG. 16B
FIG. 16A

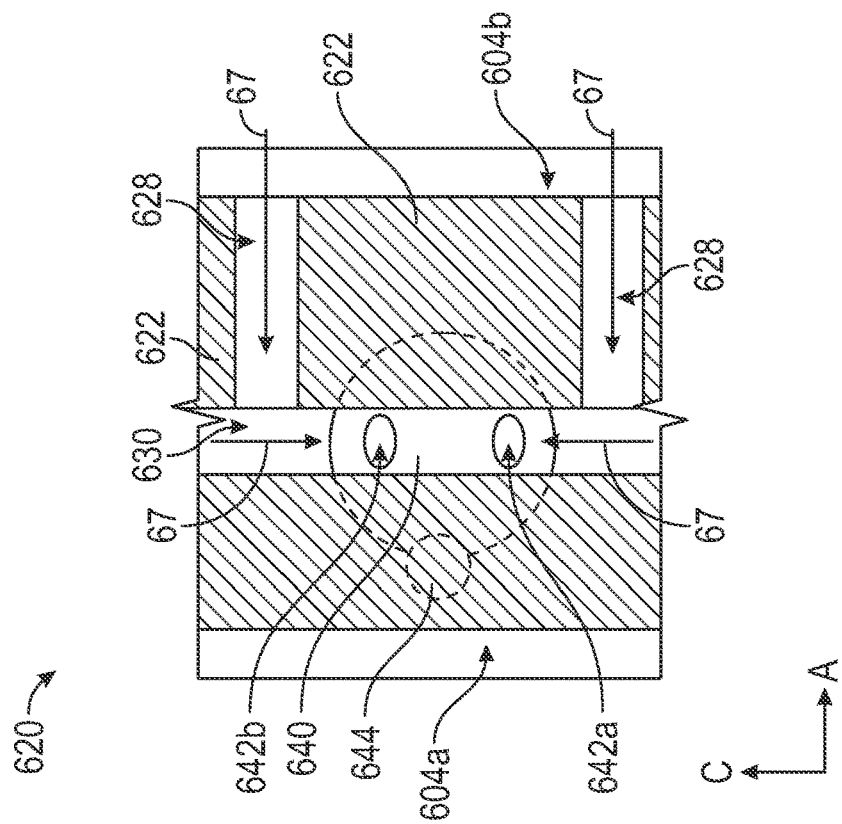
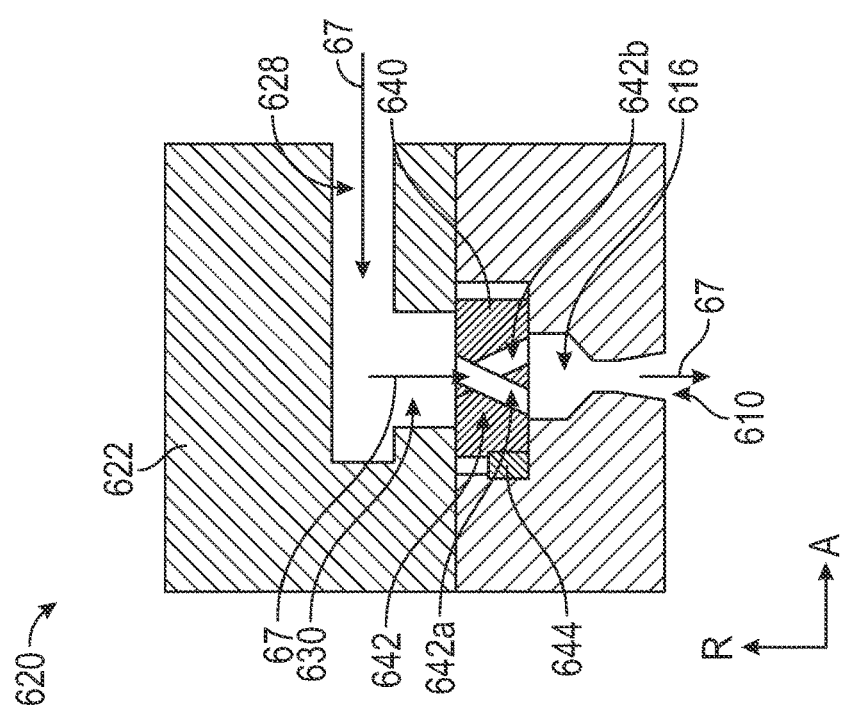

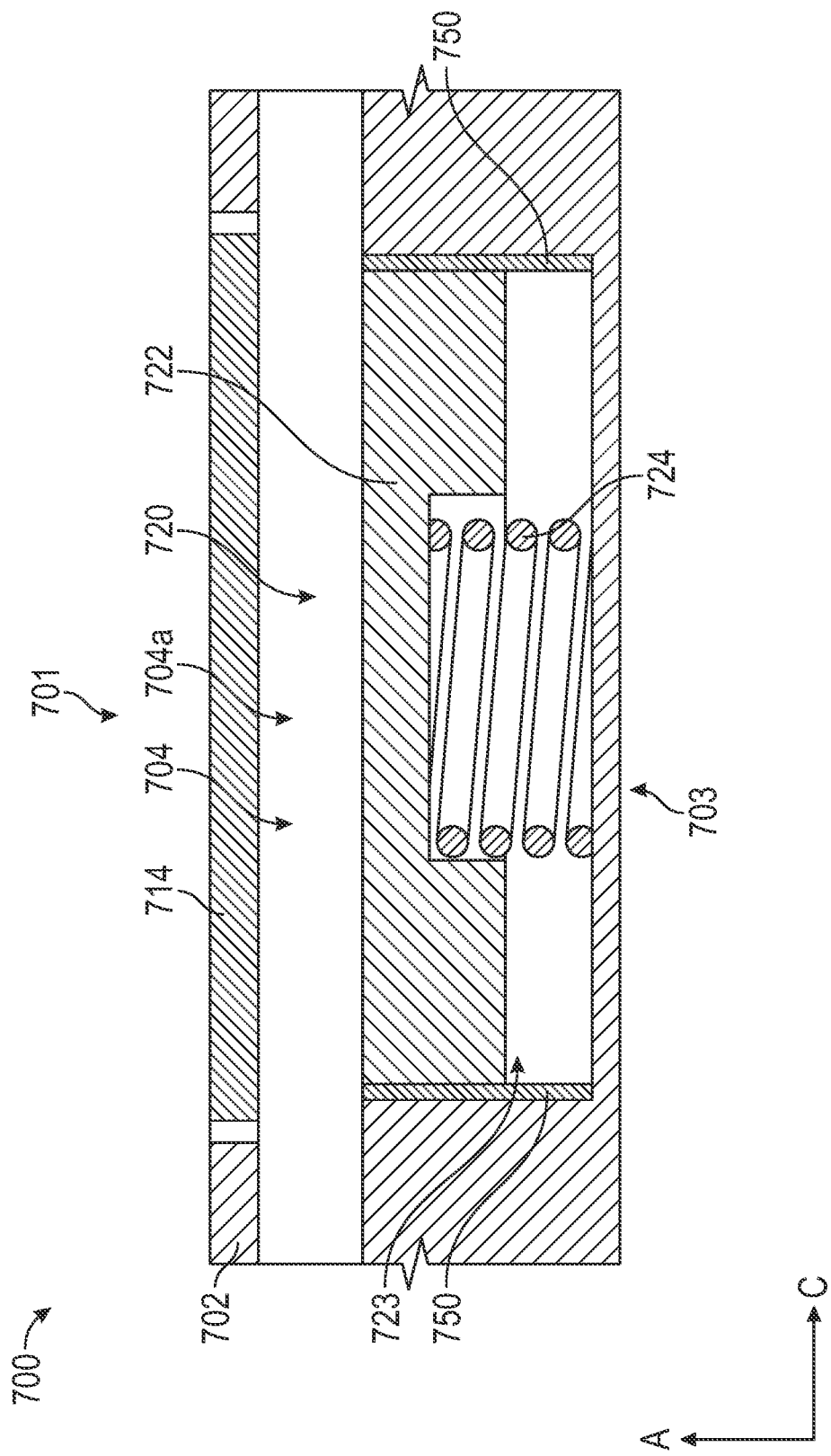

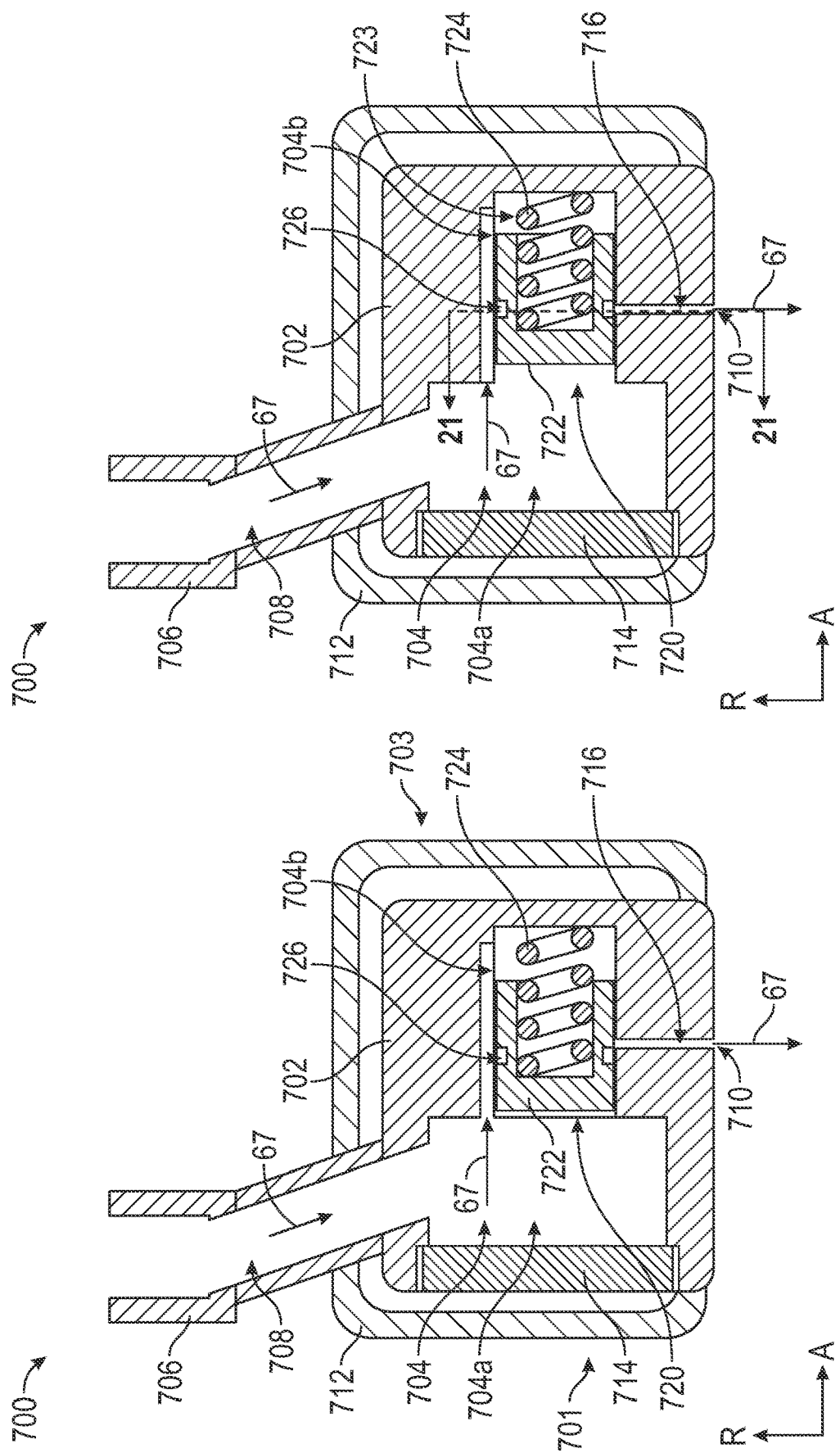

FUEL INJECTOR MANIFOLD HAVING A VARIABLE FUEL FLOW SYSTEM FOR A TURBINE ENGINE

TECHNICAL FIELD

The present disclosure relates generally to fuel injector manifolds for turbine engines, particularly, in turbine engines for aircraft.

BACKGROUND

Turbine engines generally include a propulsor (e.g., a fan or a propeller) and a turbo-engine arranged in flow communication with one another. The turbo-engine includes a compressor section, a combustor, and a turbine section. The combustor is arranged in the turbo-engine to generate combustion gases for driving the turbine section.

BRIEF DESCRIPTION OF THE DRAWINGS

Features and advantages will be apparent from the following, more particular, description of various exemplary embodiments, as illustrated in the accompanying drawings, wherein like reference numbers generally indicate identical, functionally similar, or structurally similar elements.

FIG. 3A is a schematic cross-sectional view of the fuel injector manifold of FIG. 2, taken at section line 3A-3A in FIG. 2, according to the present disclosure.

FIG. 3B is a schematic partial cross-sectional view of the fuel injector manifold of FIG. 3A, taken at section line 3B-3B in FIG. 3A, according to the present disclosure.

FIG. 5A is a schematic cross-sectional view of the fuel injector manifold of FIG. 4A, and with the variable fuel flow system of the fuel injector manifold in a partially opened state, according to the present disclosure.

FIG. 5B is a schematic cross-sectional view of the fuel injector manifold of FIG. 3A, taken at detail 5B in FIG. 3A, and with the variable fuel flow system of the fuel injector manifold in the partially opened state, according to the present disclosure.

FIG. 11A is a schematic partial cross-sectional view of the fuel injector manifold of FIG. 10A, and with the variable fuel flow system of the fuel injector manifold in a partially opened state, according to the present disclosure.

FIG. 11B is a schematic partial cross-sectional view of the fuel injector manifold of FIG. 10B, and with the variable fuel flow system of the fuel injector manifold in the partially opened state, according to the present disclosure.

FIG. 13 is schematic partial cross-sectional view of a variable fuel flow system for the fuel manifold of FIG. 9A, taken along a lateral centerline axis of the fuel injector manifold, according to another embodiment.

FIG. 14A is a schematic partial cross-sectional view of a fuel injector manifold, taken along a lateral centerline axis of the fuel injector manifold, according to another embodiment.

FIG. 15A is a schematic partial cross-sectional view of the fuel injector manifold of FIG. 14B, and with a variable fuel flow system of the fuel injector manifold in a closed state, according to the present disclosure.

FIG. 15B is a schematic partial cross-sectional view of the fuel injector manifold of FIG. 14C, and with the variable fuel flow system of the fuel injector manifold in the closed state, according to the present disclosure.

FIG. 16A is a schematic partial cross-sectional view of the fuel injector manifold of FIG. 14B, and with the variable fuel flow system of the fuel injector manifold in a partially opened state, according to the present disclosure.

FIG. 16B is a schematic cross-sectional view of the fuel injector manifold of FIG. 14C, and with the variable fuel flow system of the fuel injector manifold in the partially opened state, according to the present disclosure.

FIG. 17A is a schematic cross-sectional view of the fuel injector manifold of FIG. 14B, and with the variable fuel flow system of the fuel injector manifold in a fully opened state, according to the present disclosure.

FIG. 17B is a schematic cross-sectional view of the fuel injector manifold of FIG. 14C, and with the variable fuel flow system of the fuel injector manifold in the fully opened state, according to the present disclosure.

FIG. 18C is a schematic partial cross-sectional view of the fuel injector manifold of FIG. 18A, taken along section line 18C-18C in FIG. 18A, according to the present disclosure.

FIG. 19 is a schematic partial cross-sectional view of the fuel injector manifold of FIG. 18A, and with a variable fuel flow system of the fuel injector manifold in a partially opened state, according to the present disclosure.

FIG. 20 is a schematic cross-sectional view of the fuel injector manifold of FIG. 18A, and with the variable fuel flow system of the fuel injector manifold in a fully opened state, according to the present disclosure.

DETAILED DESCRIPTION

Figure 1:
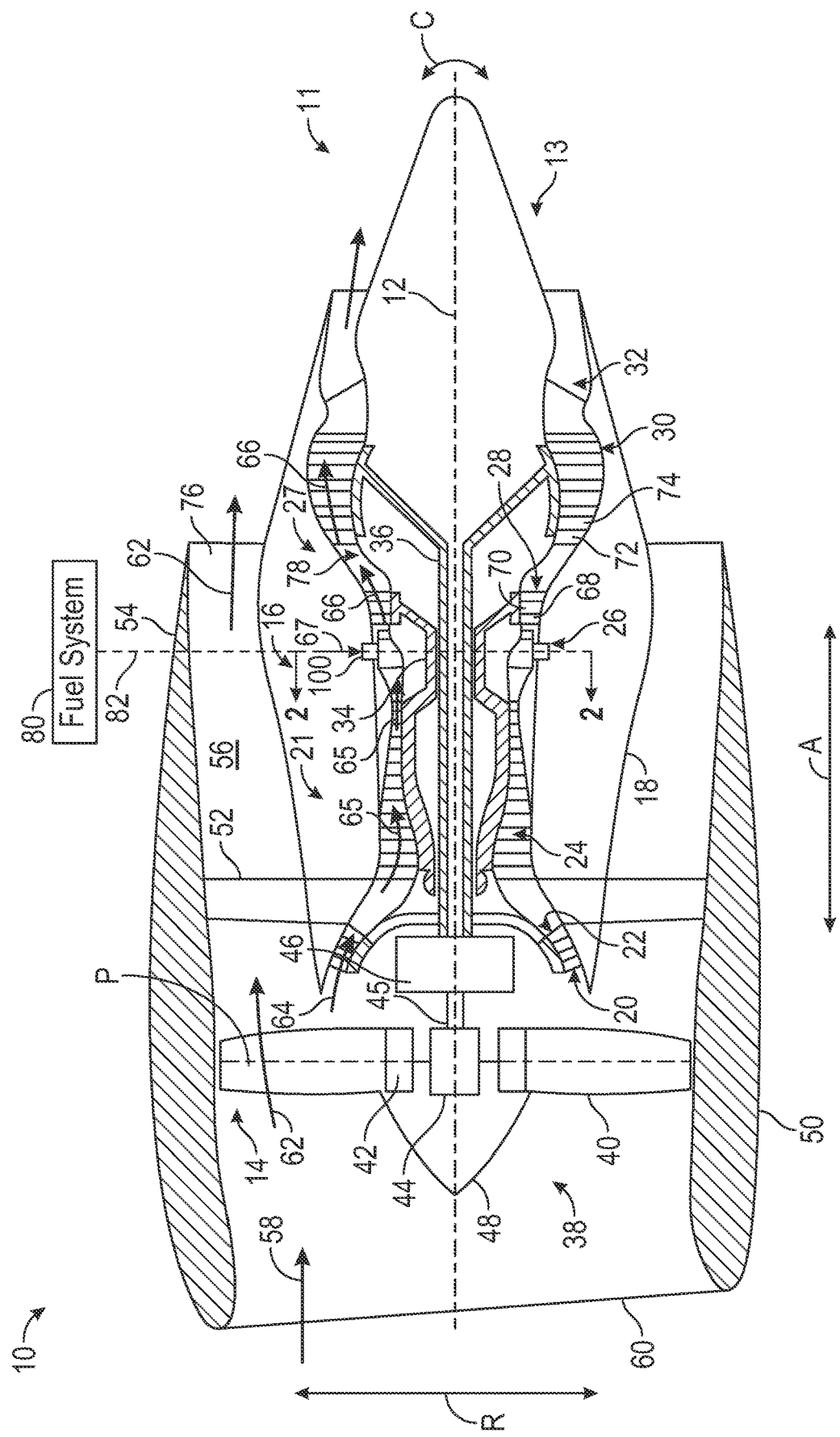
FIG. 1 is a schematic cross-sectional diagram of a turbine engine, taken along a longitudinal centerline axis of the turbine engine, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the present disclosure.

As used herein, the terms "first," "second," "third," etc., may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or a vehicle, and refer to the normal operational attitude of the turbine engine or the vehicle. For example, with regard to a high-bypass turbine engine, forward refers to a position closer to an engine inlet and aft refers to a position closer to an engine nozzle or an exhaust. In one example, in a reverse flow turbine engine, forward refers to a position closer to the engine nozzle or the exhaust and aft refers to a position closer to the engine inlet.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, a "propulsor" is a component of the turbine engine that is drivingly coupled to the turbo-engine such that rotation of the components of the turbo-engine causes the propulsor to rotate and to generate thrust. A propulsor can include a fan or a propeller. In turbofan engines, such as the turbine engine of FIG. 1, the propulsor is a fan. In turboprop engines, the propulsor is a propeller.

As used herein, a "closed state" of a variable fuel flow system is when components of the variable fuel flow system cover one or more fuel injector flowpaths to prevent fuel from flowing to the one or more fuel injector flowpaths.

As used herein, a "partially opened state" of the variable fuel flow system is when the components of the variable fuel flow system partially cover and partially uncover the fuel injector flowpaths such that the fuel flows through the partially uncovered fuel injector flowpaths.

As used herein, a "fully opened state" of the variable fuel flow system is when the components of the variable fuel flow system fully (e.g., entirely) uncover the fuel injector flowpaths such that the fuel flows through the fully uncovered fuel injector flowpaths.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified. In at least some instances, the approximating language may correspond to the precision of an instrument for measuring the value, or the precision of the methods or the machines for constructing the components or the systems or manufacturing the components or the systems. For example, the approximating language may refer to being within a one, a two, a four, a ten, a fifteen, or a twenty percent margin in either individual values, range(s) of values or endpoints defining range(s) of values.

Turbine engines have a fuel system that delivers fuel to the combustor and the fuel mixes with compressed air in the combustor to generate combustion gases. Combustors for turbine engines ignite fuel and air mixtures to generate the combustion gases, which, in turn, drive one or more turbines of the turbine engine, thereby rotating one or more loads (e.g., a fan, a propeller, etc.). In turbine engines for aircraft, the combustion gases are expelled from the turbine engine to generate thrust. Some turbine engines include a fuel injector manifold that includes a fuel manifold ring and a plurality of fuel injectors. The fuel manifold ring receives the fuel from the fuel system and distributes the fuel to the plurality of fuel injectors, and the plurality fuel injectors injects the fuel into the combustor for mixing with the air. Current fuel injector manifolds provide a fixed flow of the fuel to the fuel injectors. In particular, the fuel flows through the fuel manifold ring and through an orifice associated with a respective one of the fuel injectors. The orifice is a fixed diameter such that the area of the orifice and fuel flow path feeding the fuel injector is constant during all operating conditions (e.g., engine startup and during normal operation of the turbine engine).

Fuel pressures are relatively low during engine startup, and a delta pressure between the fuel manifold ring and the plurality of fuel injectors is low. During such conditions, the fuel and air may not atomize to generate a fine mist of the fuel, thereby becoming difficult to ignite the fuel and air mixture. Thus, starting the turbine engine with the low delta pressure is difficult. Atomization of the fuel and the air also reduces when the fuel is cold (e.g., at higher altitudes and lower ambient temperatures) or if the type of fuel used has a high viscosity.

Accordingly, the present disclosure provides for a fuel injector manifold having a variable fuel flow system that varies the fuel flow to the plurality of fuel injectors for creating a higher delta pressure at or near the point of injection during all operating conditions of the turbine engine. In particular, the variable fuel flow system includes one or more pistons and one or more actuation mechanisms coupled to the one or more pistons. The pistons are disposed within the fuel manifold ring and include holes for directing the fuel through the pistons from the fuel manifold ring and into the fuel injectors. The pistons slide back and forth within the fuel manifold ring to open and to close the orifices of the fuel injectors. As the pistons slide back and forth, the holes on the pistons partially align or fully align with the orifices of the fuel injectors. This creates a variable inlet area of the orifices of the fuel injectors for generating a higher delta pressure across the fuel injectors as compared to fuel injector manifolds without the present disclosure. The pistons have cross holes that extend through the pistons to create a pressure drop across the pistons to passively actuate the pistons.

In some embodiments, the one or more pistons include a single piston that is annular about the fuel manifold ring. In some embodiments, the pistons include a plurality of pistons, each piston being disposed at a respective fuel injector. The holes of the pistons can be generally circular, oval shaped, slits, or the like. The holes can include a single hole at each fuel injector or can include a plurality of holes at each fuel injector. In some embodiments, a pressure atomizer is disposed within the fuel injector for assisting in atomizing the fuel. In some embodiments, the actuation mechanisms are passive actuation mechanisms (e.g., springs, memory material, or the like) for passively moving the pistons. In some embodiments, the actuation mechanisms are active actuation mechanisms (e.g., hydraulic actuators, pneumatic actuators, mechanical actuators, or the like) that are controlled to move the pistons.

Accordingly, the variable fuel flow system adjusts the delta pressure between the fuel manifold ring and the plurality of fuel injectors to ensure the high delta pressure for increasing the atomization of the fuel and the air, as compared to turbine engines without the benefit of the present disclosure. This increases the momentum of the fuel jet from the fuel injectors to improve the atomization and mixing of the fuel and the air, thereby making it easier for the fuel and air mixture to ignite and to combust, as compared to turbine engines without the benefit of the present disclosure. In this way, the variable fuel flow system provides for improved ignition capability, especially, for cold fuels (e.g., at higher altitudes) or high viscosity fuels by increasing the atomization of the fuel and the air. This leads to improved sub-idle efficiency and low power efficiency of the combustor due to the increased atomization, and lower smoke generation at high power operation, as compared to turbine engines without the benefit of the present disclosure.

Referring now to the drawings, FIG. 1 is a schematic cross-sectional diagram of a turbine engine 10, taken along a longitudinal centerline axis 12 of the turbine engine 10, according to an embodiment of the present disclosure. As shown in FIG. 1, the turbine engine 10 defines an axial direction A extending parallel to the longitudinal centerline axis 12, a radial direction R that is normal to the axial direction A, and a circumferential direction C that extends arcuately about the longitudinal centerline axis 12. In the orientation of FIG. 1, portions of the turbine engine 10 above the longitudinal centerline axis 12 are referred to as a top portion 11 and portions of the turbine engine 10 below the longitudinal centerline axis 12 are referred to as a bottom portion 13.

In general, the turbine engine 10 includes a propulsor section 14 and a turbo-engine 16 disposed downstream from the propulsor section 14. The turbo-engine 16 includes, in serial flow relationship, a compressor section 21, a combustor 26, and a turbine section 27. The turbo-engine 16 is substantially enclosed within an outer casing 18 that is substantially tubular and defines a core inlet 20 that is annular about the longitudinal centerline axis 12. As schematically shown in FIG. 1, the compressor section 21 includes a booster or a low pressure (LP) compressor 22 followed downstream by a high pressure (HP) compressor 24. The combustor 26 is downstream of the compressor section 21. The turbine section 27 is downstream of the combustor 26 and includes a high pressure (HP) turbine 28 followed downstream by a low pressure (LP) turbine 30. The turbo-engine 16 further includes a jet exhaust nozzle section 32 that is downstream of the turbine section 27, a high-pressure (HP) shaft 34, and a low-pressure (LP) shaft 36. The HP shaft 34 drivingly connects the HP turbine 28 to the HP compressor 24, and the HP compressor 24, the HP turbine 28, and the HP shaft 34 are together referred to as an HP spool. The HP turbine 28 and the HP compressor 24 rotate in unison through the HP shaft 34. The LP shaft 36 drivingly connects the LP turbine 30 to the LP compressor 22, and the LP compressor 22, the LP turbine 30, and the LP shaft 36 are together referred to as an LP spool. The LP turbine 30 and the LP compressor 22 rotate in unison through the LP shaft 36. The compressor section 21, the combustor 26, the turbine section 27, and the jet exhaust nozzle section 32 together define a core airflow path.

For the embodiment depicted in FIG. 1, the propulsor section 14 includes a propulsor 38 (e.g., a variable pitch propulsor) having a plurality of propulsor blades 40 coupled to a disk 42 in a spaced apart manner. In FIG. 1, the propulsor 38 is a fan and the propulsor blades 40 are fan blades. The propulsor blades 40 extend outwardly from the disk 42 generally along the radial direction R. In the case of a variable pitch propulsor, the plurality of propulsor blades 40 is rotatable relative to the disk 42 about a pitch axis P by virtue of the propulsor blades 40 being operatively coupled to an actuation member 44 configured to collectively vary the pitch of the propulsor blades 40 in unison. The propulsor blades 40, the disk 42, and the actuation member 44 are together rotatable about the longitudinal centerline axis 12 via a propulsor shaft 45 that is powered by the LP shaft 36 across a power gearbox, also referred to as a gearbox assembly 46 (e.g., the turbine engine 10 is an indirect drive engine). In this way, the propulsor 38 is drivingly coupled to, and powered by, the turbo-engine 16. The gearbox assembly 46 is shown schematically in FIG. 1. The gearbox assembly 46 is a reduction gearbox assembly for adjusting the rotational speed of the propulsor shaft 45 and, thus, the propulsor 38 relative to the LP shaft 36 when power is transferred from the LP shaft 36 to the propulsor shaft 45.

Referring still to the exemplary embodiment of FIG. 1, the disk 42 is covered by a propulsor hub 48 that is aerodynamically contoured to promote an airflow through the plurality of propulsor blades 40. In addition, the propulsor section 14 includes an annular propulsor casing or a nacelle 50 that circumferentially surrounds the propulsor 38 and at least a portion of the turbo-engine 16. The nacelle 50 is supported relative to the turbo-engine 16 by a plurality of outlet guide vanes 52 that is circumferentially spaced about the nacelle 50 and the turbo-engine 16. Moreover, a downstream section 54 of the nacelle 50 extends over an outer portion of the turbo-engine 16, and, with the outer casing 18, defines a bypass airflow passage 56 therebetween.

During operation of the turbine engine 10, a volume of air 58 enters the turbine engine 10 through an inlet 60 of the nacelle 50 or the propulsor section 14. As the volume of air 58 passes across the propulsor blades 40, a first portion of air, also referred to as bypass air 62, is directed into the bypass airflow passage 56. At the same time, a second portion of air, also referred to as core air 64, is directed into the upstream section of the core airflow path through the core inlet 20 of the LP compressor 22. The pressure of the core air 64 is then increased through the LP compressor 22, generating compressed air 65. The compressed air 65 is directed through the HP compressor 24, where the pressure of the compressed air 65 is further increased. The compressed air 65 is then directed into the combustor 26, where the compressed air 65 is mixed with fuel 67 and ignited to generate combustion gases 66.

The combustion gases 66 are directed into the HP turbine 28 and expanded through the HP turbine 28 where a portion of thermal energy or kinetic energy from the combustion gases 66 is extracted via one or more stages of HP turbine stator vanes 68 and HP turbine rotor blades 70 that are coupled to the HP shaft 34. This causes the HP shaft 34 to rotate, thereby supporting operation of the HP compressor 24 through the HP shaft 34 (self-sustaining cycle). In this way, the combustion gases 66 do work on the HP turbine 28. The combustion gases 66 are then directed into the LP turbine 30 and expanded through the LP turbine 30. Here, a second portion of the thermal energy or the kinetic energy is extracted from the combustion gases 66 via one or more stages of LP turbine stator vanes 72 and LP turbine rotor blades 74 that are coupled to the LP shaft 36. This causes the LP shaft 36 to rotate, thereby supporting operation of the LP compressor 22 (self-sustaining cycle) and rotation of the propulsor 38 through the LP shaft 36 via the gearbox assembly 46. In this way, the combustion gases 66 do work on the LP turbine 30.

The combustion gases 66 are subsequently directed through the jet exhaust nozzle section 32 of the turbo-engine 16 to provide propulsive thrust. Simultaneously, the bypass air 62 is routed through the bypass airflow passage 56 before being exhausted from a propulsor nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the turbo-engine 16.

As detailed above, the core air 64 (e.g., the compressed air 65) is mixed with the fuel 67 in the combustor 26 to produce the combustion gases 66. The turbine engine 10 also includes a fuel system 80 for providing the fuel 67 to the combustor 26. The fuel system 80 includes a fuel tank (not shown) for storing the fuel 67 therein and one or more fuel supply lines 82 to provide the fuel 67 to the combustor 26. The fuel system 80 can include one or more valves for controlling an amount of the fuel 67 provided to the combustor 26. The fuel 67 can be any type of fuel used for turbine engines including liquid fuel or gaseous fuel. For example, the fuel 67 can be JetA, sustainable aviation fuels (SAF) including biofuels, hydrogen-based fuel ($H_2$), or the like. The turbine engine 10 also includes a fuel injector manifold 100. The fuel system 80 supplies the fuel 67 to the fuel injector manifold 100, and the fuel injector manifold 100 distributes the fuel 67 to a plurality of fuel injectors for injecting the fuel 67 into the combustor 26, as detailed further below.

The turbine engine 10 depicted in FIG. 1 is by way of example only. In other exemplary embodiments, the turbine engine 10 may have any other suitable configuration. For example, in other exemplary embodiments, the propulsor 38 may be configured in any other suitable manner (e.g., as a fixed pitch propulsor) and further may be supported using any other suitable propulsor frame configuration. The turbine engine 10 may also be a direct drive engine, which does not have a power gearbox. The propulsor speed is the same as the LP shaft speed for a direct drive engine. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, turboprop, or turboshaft engines.

Figure 2:
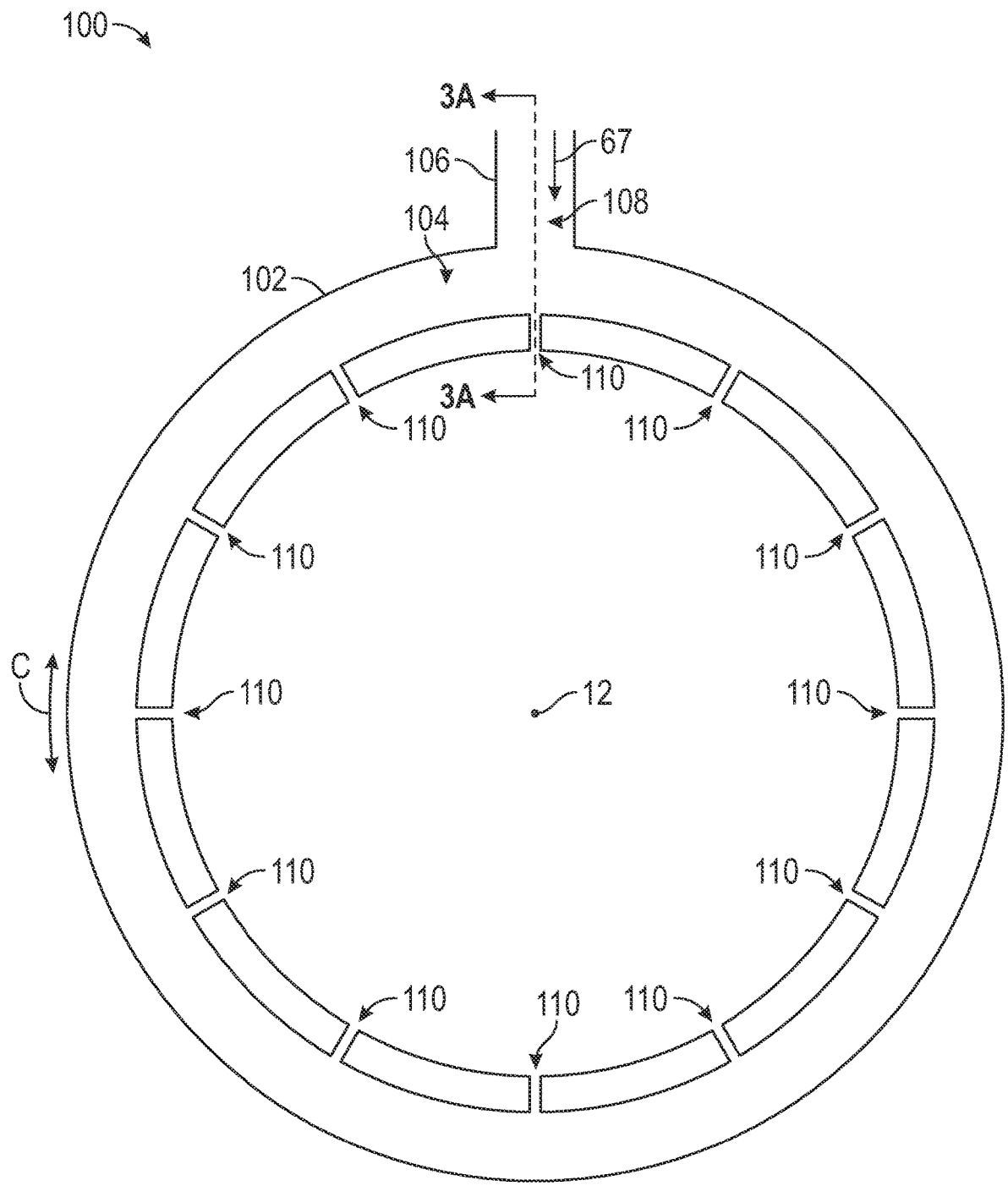
FIG. 2 is a schematic rear view of a fuel injector manifold of the turbine engine of FIG. 1, taken at section line 2-2 in FIG. 1, according to the present disclosure.

FIG. 2 is a schematic cross-sectional view of the fuel injector manifold 100 of the turbine engine 10 (FIG. 1), taken at section line 2-2 in FIG. 1, according to the present disclosure. The fuel injector manifold 100 includes a fuel manifold ring 102 that is annular about the longitudinal centerline axis 12. The fuel manifold ring 102 defines a fuel manifold flowpath 104 within the fuel manifold ring 102. The fuel manifold flowpath 104 is annular about the longitudinal centerline axis 12. The fuel injector manifold 100 also includes a fuel manifold inlet 106. The fuel manifold inlet 106 defines a fuel manifold inlet flowpath 108 within the fuel manifold inlet 106. The fuel manifold inlet flowpath 108 is in fluid communication with the fuel system 80 (FIG. 1) via the one or more fuel supply lines 82 (FIG. 1) and with the fuel manifold flowpath 104. While one fuel manifold inlet 106 is shown in FIG. 2, the fuel injector manifold 100 can include any number of fuel manifold inlets 106 for supplying the fuel 67 to the fuel manifold flowpath 104.

The fuel injector manifold 100 includes a plurality of fuel injectors 110. The plurality of fuel injectors 110 is in fluid communication with the fuel manifold flowpath 104 and the combustor 26 (FIG. 1). While twelve fuel injectors 110 are shown in FIG. 2, the fuel injector manifold 100 can include any number of fuel injectors 110 for injecting the fuel 67 into the combustor 26. The plurality of fuel injectors 110 is spaced circumferentially about the fuel manifold ring 102. The fuel injector manifold 100 is mounted about the combustor 26 such that the plurality of fuel injectors 110 is oriented to inject the fuel 67 into the combustor 26. In FIG. 2, the plurality of fuel injectors 110 is oriented to inject the fuel 67 generally radially into the combustor 26. In some embodiments, the plurality of fuel injectors 110 is oriented to inject the fuel 67 generally axially into the combustor 26. In some embodiments, the plurality of fuel injectors 110 is disposed at a non-zero angle with respect to the circumferential direction C or with respect to the axial direction A (FIG. 1), as detailed further below. In some embodiments, some of the fuel injectors 110 are oriented to inject the fuel 67 generally radially into the combustor 26 and some of the fuel injectors 110 are oriented to inject the fuel 67 generally axially into the combustor 26.

In operation, the fuel system 80 (FIG. 1) supplies the fuel 67 to the fuel injector manifold 100 through the one or more fuel supply lines 82 (FIG. 1). In particular, the fuel manifold inlet flowpath 108 directs the fuel 67 from the one or more fuel supply lines 82 into the fuel manifold flowpath 104. The fuel manifold flowpath 104 directs the fuel 67 circumferentially about the fuel manifold ring 102. Each of the plurality of fuel injectors 110 directs the fuel 67 from the fuel manifold flowpath 104 into the combustor 26 (FIG. 1) to inject the fuel 67 into the combustor 26. At the combustor 26, the fuel 67 mixes with the compressed air 65 (FIG. 1) and is ignited to generate the combustion gases 66 (FIG. 1), as discussed above. The fuel injector manifold 100 includes a variable fuel flow system to vary a flow of the fuel 67 through the plurality of fuel injectors 110, as detailed further below.

Figure 3C:
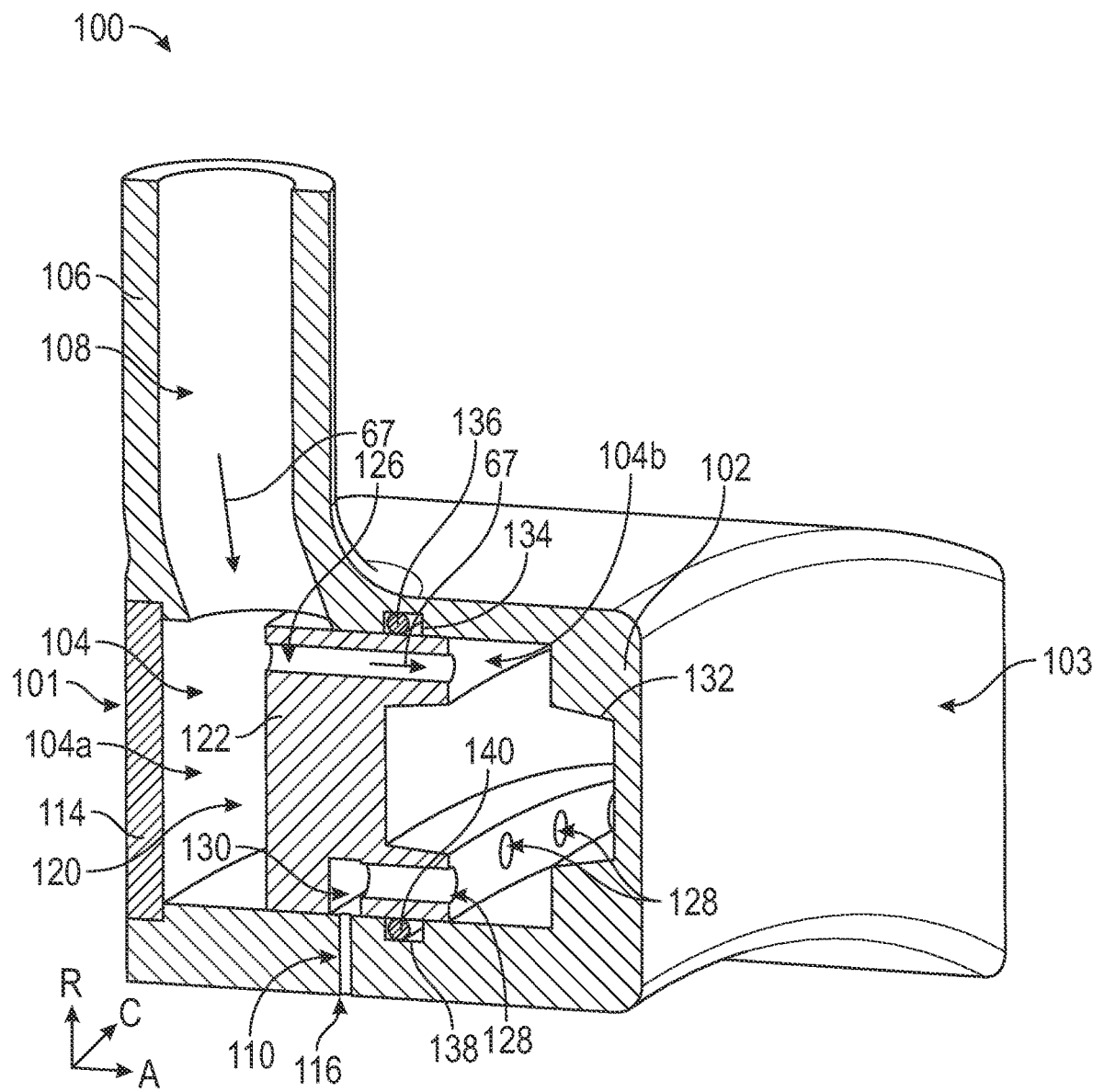
FIG. 3C is a schematic partial cross-sectional view of the fuel injector manifold of FIG. 3A, according to the present disclosure.

FIG. 3A is a schematic cross-sectional view of the fuel injector manifold 100, taken at section line 3A-3A in FIG. 2, according to the present disclosure. FIG. 3B is a schematic partial cross-sectional view of the fuel injector manifold 100, taken at section line 3B-3B in FIG. 3A, according to the present disclosure. FIG. 3C is a schematic partial cross-sectional view of the fuel injector manifold 100. As shown in FIGS. 3A and 3C, the fuel injector manifold 100 extends axially from an aft end 101 to a forward end 103. The fuel injector manifold 100 includes a fuel manifold heat shield 112 (FIGS. 3A and 3B, removed from FIG. 3C for clarity) that covers at least a portion of the fuel manifold ring 102. In particular, the fuel manifold heat shield 112 encloses the fuel manifold ring 102 about substantially an entire circumference of the fuel manifold ring 102. In this way, the fuel manifold heat shield 112 is annular about the longitudinal centerline axis 12 (FIG. 2). The fuel manifold heat shield 112 protects the fuel manifold ring 102 from the hot combustion gases 66 (FIG. 1) in the combustor 26 (FIG. 1). The fuel manifold ring 102 includes a radially outer groove 134 and a radially inner groove 138. A first sealing member 136 is located within the radially outer groove 134 and a second sealing member 140 is located within the radially inner groove 138.

The fuel manifold ring 102 includes a plug 114 that closes the fuel manifold flowpath 104 at the aft end 101 of the fuel manifold ring 102. The plug 114 is coupled to the fuel manifold ring 102 after a variable fuel flow system 120 of the fuel injector manifold 100 has been assembled within the fuel manifold ring 102.

Each of the plurality of fuel injectors 110 includes an orifice, also referred to as a fuel injector flowpath 116, in fluid communication with the fuel manifold flowpath 104 and the combustor 26 (FIG. 1). The fuel injector flowpath 116 extends through the fuel manifold ring 102 at the respective fuel injector 110. In this way, each of the plurality of fuel injectors 110 injects the fuel 67 into the combustor 26 through the fuel injector flowpath 116, as detailed further below. The fuel injector flowpath 116 extends through a radially inner portion of the fuel manifold ring 102 such that the fuel injector flowpath 116 is disposed radially inward of the fuel manifold flowpath 104. The fuel injector flowpath 116 is circular shaped. In some embodiments, the fuel injector flowpath 116 is oval shaped, is a slit, or can include any shape for directing the fuel 67 therethrough.

The fuel injector manifold 100 includes the variable fuel flow system 120 disposed within the fuel manifold ring 102. In particular, the variable fuel flow system 120 is disposed within the fuel manifold flowpath 104 and varies the flow of the fuel 67 through the plurality of fuel injectors 110, as detailed further below. The variable fuel flow system 120 includes a piston 122 and an actuation mechanism 124 that moves the piston 122. The piston 122 is annular and extends circumferentially about the fuel manifold ring 102 within the fuel manifold flowpath 104. In particular, the piston 122 is disposed within the fuel manifold flowpath 104 upstream (e.g., axially forward) of the fuel manifold inlet flowpath 108. In this way, the piston 122 splits the fuel manifold flowpath 104 into an upstream fuel manifold flowpath 104a and a downstream fuel manifold flowpath 104b. The upstream fuel manifold flowpath 104a is upstream of the piston 122, and the downstream fuel manifold flowpath 104b is downstream of the piston 122. In FIG. 3A, the upstream fuel manifold flowpath 104a is aft of the piston 122 and the downstream fuel manifold flowpath 104b is forward of the piston 122. The aft to forward arrangement, however, may be reversed.

The piston 122 is slidably coupled within the fuel manifold ring 102 (e.g., in the fuel manifold flowpath) such that the piston 122 moves generally axially within the fuel manifold flowpath 104. In particular, the piston 122 can move axially forward and axially aftward between the aft end 101 and the forward end 103. The piston 122 extends radially substantially an entire radial height of the fuel manifold flowpath 104 such that a small gap or a small space is defined between the piston 122 and an inner surface of the fuel manifold ring 102. In this way, the piston 122 can move with respect to the fuel manifold ring 102. In some embodiments, one or more seals are disposed within the small gap to seal the small gap between the piston 122 and the fuel manifold ring 102 and to prevent the fuel 67 from flowing through the small gap.

The actuation mechanism 124 is coupled to the piston 122 for moving the piston 122 within the fuel manifold flowpath 104. The forward end 103 of the fuel manifold ring 102 includes a groove 132. A forward end of the actuation mechanism 124 is located within the groove 132. In FIG. 3A, the actuation mechanism 124 is a spring, and, particularly, is a wave spring. In this way, the actuation mechanism 124 is a passive actuation mechanism that biases the piston 122 aftward. As the piston 122 moves forward, the actuation mechanism 124 contracts and stores potential energy. The actuation mechanism 124 releases the potential energy to move the piston 122 axially aftward. Thus, the piston 122 can move to vary the flow of the fuel 67 through the plurality of fuel injectors 110, as detailed further below with respect to FIGS. 4A to 6B. The actuation mechanism 124 is annular about the fuel injector manifold 100. In some embodiments, the variable fuel flow system 120 includes a plurality of actuation mechanisms 124 that is spaced circumferentially about the fuel injector manifold 100. The actuation mechanism 124 can be any of the actuation mechanisms detailed herein.

The piston 122 includes one or more piston flowpaths 126, 128, and 130 including one or more first piston flowpaths 126, one or more second piston flowpaths 128, and one or more third piston flowpaths 130. The one or more first piston flowpaths 126 extend substantially axially through the piston 122 from the aft end 101 of the piston 122 to the forward end 103 of the piston 122. In this way, the one or more first piston flowpaths 126 provide fluid communication from the upstream fuel manifold flowpath 104a to the downstream fuel manifold flowpath 104b through the piston 122. The one or more first piston flowpaths 126 are positioned at a radially outward portion of the piston 122. The one or more first piston flowpaths 126 are spaced circumferentially about the piston 122. While one first piston flowpath 126 is shown in FIG. 3A, the one or more first piston flowpaths 126 can include any number of first piston flowpaths 126, as necessary, for directing the fuel 67 from the upstream fuel manifold flowpath 104a to the downstream fuel manifold flowpath 104b.

The one or more second piston flowpaths 128 extend substantially axially through the piston 122 from the forward end 103 towards the aft end 101 of the piston 122. The one or more second piston flowpaths 128 are in fluid communication from the downstream fuel manifold flowpath 104b. The one or more second piston flowpaths 128 do not extend through the aft end 101 of the piston 122 such that the one or more second piston flowpaths 128 are not in fluid communication with the upstream fuel manifold flowpath 104a. The one or more second piston flowpaths 128 are positioned at a radially inward portion of the piston 122. As shown in FIG. 3B, the one or more second piston flowpaths 128 are spaced circumferentially about the piston 122. In FIG. 3B, the one or more second piston flowpaths 128 include two second piston flowpaths 128 for each of the plurality of fuel injectors 110. The one or more second piston flowpaths 128 can include any number of second piston flowpaths 128, as necessary, for directing the fuel 67 from the downstream fuel manifold flowpath 104b to the one or more third piston flowpaths 130.

The one or more third piston flowpaths 130 extend substantially radially through the piston 122 from the one or more second piston flowpaths 128 to a radially inner surface of the piston 122. In this way, the one or more third piston flowpaths 130 are in fluid communication with the one or more second piston flowpaths 128 and are selectively in fluid communication with the fuel injector flowpath 116 of a respective fuel injector 110. The one or more third piston flowpaths 130 (FIGS. 3A and 3C) include a single third piston flowpath 130 that is annular about the piston 122. In some embodiments, the one or more third piston flowpaths 130 can include discrete flowpaths that are spaced circumferentially about the piston 122. The one or more third piston flowpaths 130 can include any number of third piston flowpaths 130, as necessary, for directing the fuel 67 from the one or more second piston flowpaths 128 to the fuel injector flowpath 116 of each of the plurality of fuel injectors 110.

Figure 4B:
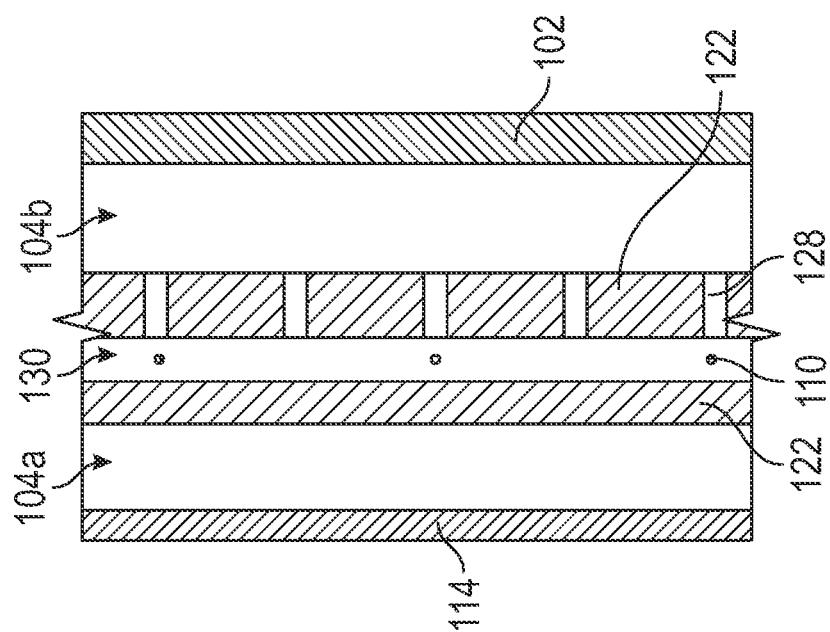
FIG. 4B is a schematic partial cross-sectional view of the fuel injector manifold of FIG. 3A, taken at section line 4B-4B in FIG. 3A, and with the variable fuel flow system of the fuel injector manifold in the closed state, according to the present disclosure.
Figure 4A:
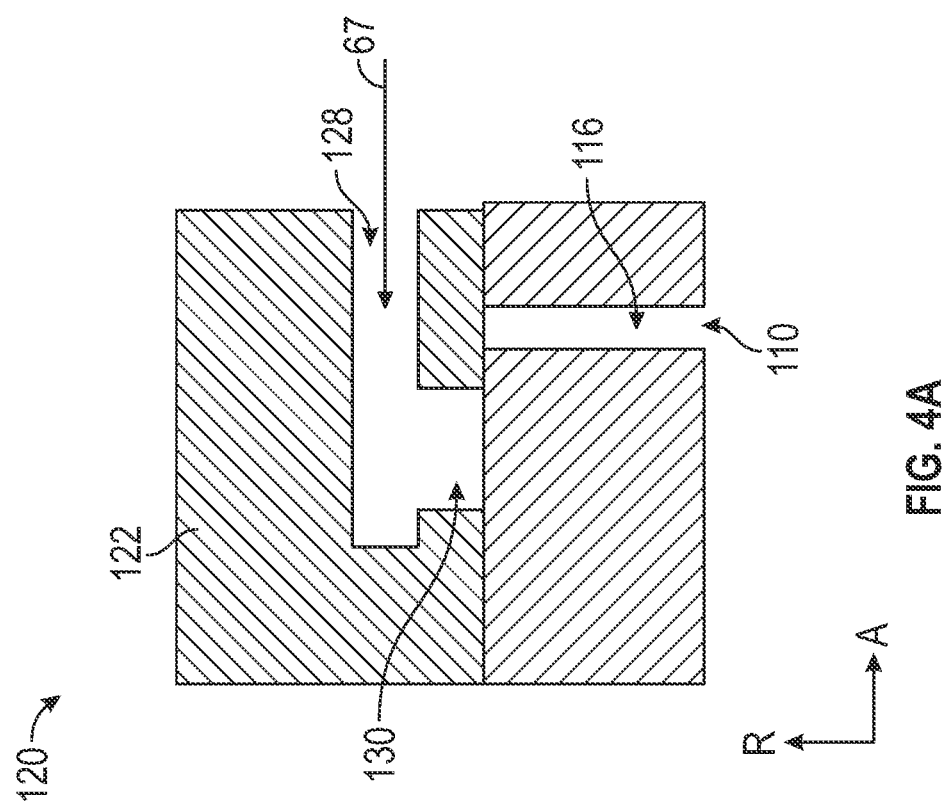
FIG. 4A is a schematic partial cross-sectional view of the fuel injector manifold of FIG. 3A, taken at detail 4A in FIG. 3A, and with a variable fuel flow system of the fuel injector manifold in a closed state, according to the present disclosure.
Figure 6B:
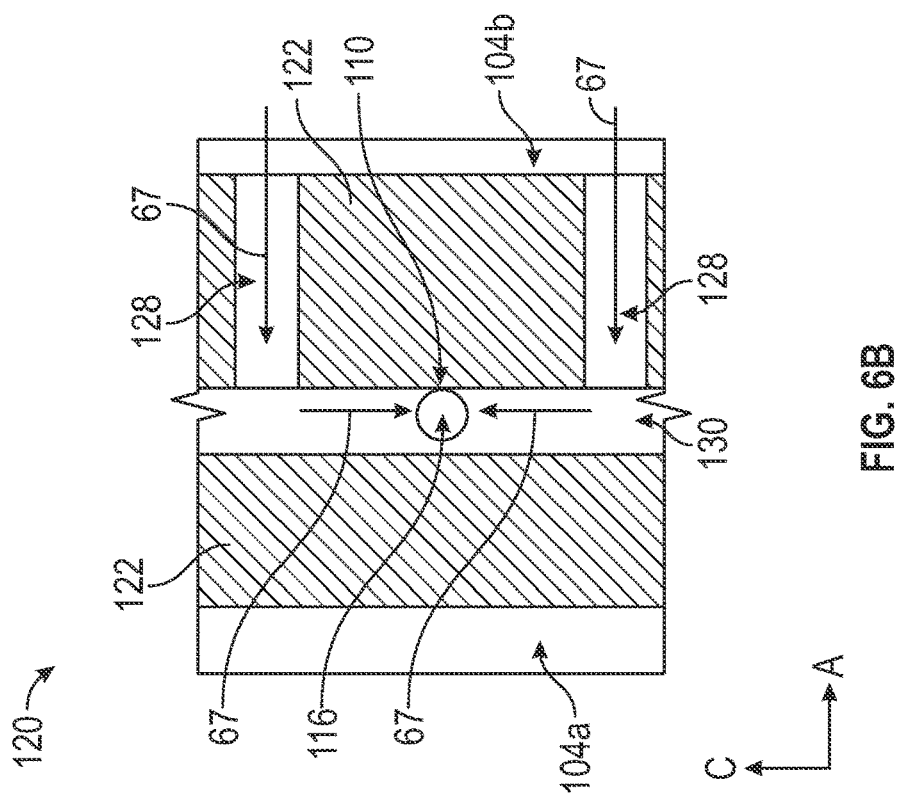
FIG. 6B is a schematic cross-sectional view of the fuel injector manifold of FIG. 5B, and with the variable fuel flow system of the fuel injector manifold in the fully opened state, according to the present disclosure.
Figure 6A:
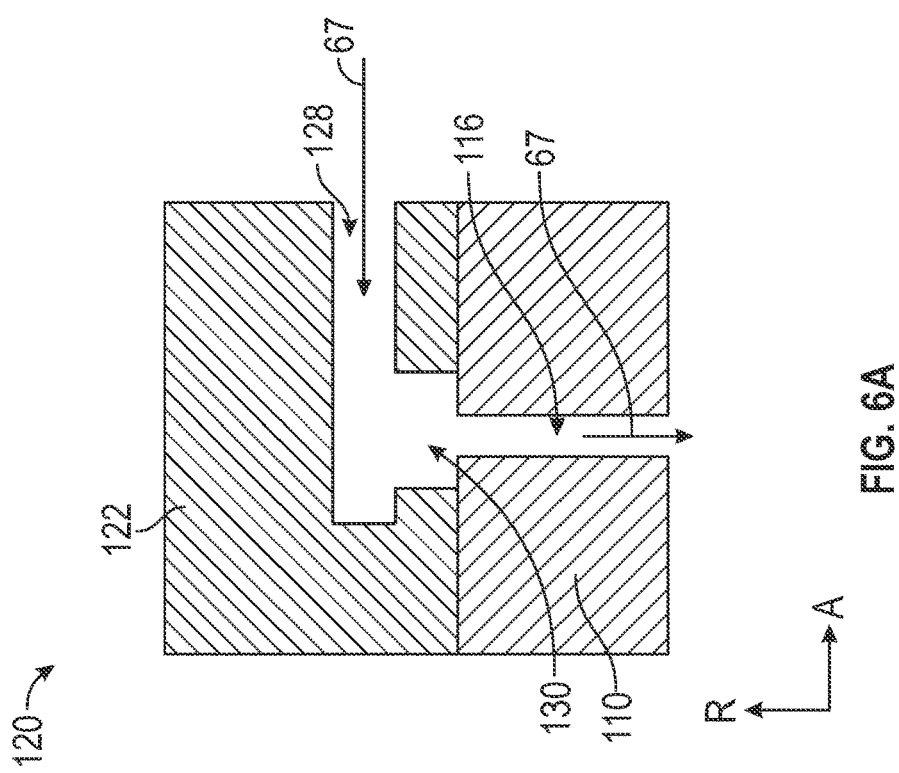
FIG. 6A is a schematic cross-sectional view of the fuel injector manifold of FIGS. 4A and 5A, and with the variable fuel flow system of the fuel injector manifold in a fully opened state, according to the present disclosure.

FIG. 4A is a schematic cross-sectional view of the fuel injector manifold 100, taken at detail 4A in FIG. 3A, and with the variable fuel flow system 120 in a close state, according to the present disclosure. FIGS. 5A and 6A are schematic cross-sectional views of the fuel injector manifold 100 of FIG. 4A, and with the variable fuel flow system 120 in a partially opened state (FIG. 5A) and in a fully opened state (FIG. 6A), respectively, according to the present disclosure. FIG. 4B is a schematic cross-sectional view of the fuel injector manifold 100, taken at section line 4B-4B in FIG. 3A, and with the variable fuel flow system 120 in the closed state. FIG. 5B is a schematic cross-sectional view of the fuel injector manifold 100, taken at detail 4A in FIG. 3A, with the variable fuel flow system 120 in the partially opened state. FIG. 6B is a schematic cross-sectional view of the fuel injector manifold 100 of FIG. 5B, and with the variable fuel flow system 120 in the fully opened state, according to the present disclosure.

Operation of the fuel injector manifold 100 will now be described with reference to FIGS. 3A, 4A, 4B, 5A, 5B, 6A, and 6B. When there is no fuel 67 flow, or minimal fuel 67 flow, into the fuel injector manifold 100, the variable fuel flow system 120 is in the closed state (FIGS. 4A and 4B) such that the piston 122 covers the fuel injector flowpath 116 and no fuel 67 flows through the fuel injector flowpath 116. In particular, the one or more third piston flowpaths 130 are axially offset from the fuel injector flowpath 116. In operation, the fuel manifold inlet flowpath 108 directs the fuel 67 from the one or more fuel supply lines 82 (FIG. 1) of the fuel system 80 (FIG. 1) into the fuel manifold flowpath 104, as mentioned above. In particular, the fuel 67 flows into the upstream fuel manifold flowpath 104a. Once the fuel 67 fills the upstream fuel manifold flowpath 104a to the one or more first piston flowpaths 126, the one or more first piston flowpaths 126 direct the fuel 67 from the upstream fuel manifold flowpath 104a to the downstream fuel manifold flowpath 104b. In this way, the fuel 67 fills the downstream fuel manifold flowpath 104b.

As the fuel 67 continues to flow into the upstream fuel manifold flowpath 104a, a pressure of the fuel 67 in the upstream fuel manifold flowpath 104a acts on the piston 122 to move the piston 122 towards the forward end 103 of the fuel injector manifold 100. The pressure of the fuel 67 in the upstream fuel manifold flowpath 104a is greater than the pressure of the fuel 67 in the downstream fuel manifold flowpath 104b. In this way, the fuel 67 in the upstream fuel manifold flowpath 104a applies a force on the piston 122, and the force overcomes the actuation mechanism 124. This causes the piston 122 to move towards the forward end 103. As the piston 122 moves toward the forward end 103, the one or more third piston flowpaths 130 begin to align with the fuel injector flowpath 116 such that the piston 122 partially uncovers the fuel injector flowpath 116. When the one or more third piston flowpaths 130 are partially aligned with the fuel injector flowpath 116, the variable fuel flow system 120 is in the partially opened state (FIGS. 5A and 5B), and the one or more third piston flowpaths 130 direct a portion of the fuel 67 into the fuel injector flowpath 116. The fuel injector flowpath 116 directs the portion of the fuel 67 therethrough to inject the portion of the fuel 67 into the combustor 26 (FIG. 1). Accordingly, the variable fuel flow system 120 generates a high delta pressure across the fuel injector flowpath 116 even at low flows of the fuel 67 due to the partial alignment of the one or more third piston flowpaths 130 and the fuel injector flowpath 116. This helps to atomize the fuel 67 into a fine mist during startup of the turbine engine 10, when the fuel 67 is cold (e.g., at high altitude or at low ambient temperatures), and when the fuel 67 has a high viscosity.

As the fuel 67 continues to flow into the upstream fuel manifold flowpath 104 (e.g., during higher power operation when there is more fuel pressure), the fuel 67 continues to push the piston 122 towards the forward end 103. This causes the one or more third piston flowpaths 130 to completely align with the fuel injector flowpath 116, such that the piston 122 fully uncovers the fuel injector flowpath 116. In this way, the variable fuel flow system 120 is in the fully opened state (FIGS. 6A and 6B), and more fuel 67 is injected through the fuel injector flowpath 116 as compared to the partially opened state. Accordingly, the variable fuel flow system 120 provides a variable inlet area of the fuel injector flowpath 116 to generate the high delta pressure across the fuel injector flowpath 116 and to atomize the fuel 67 into the fine mist at all operating conditions.

Figure 7:
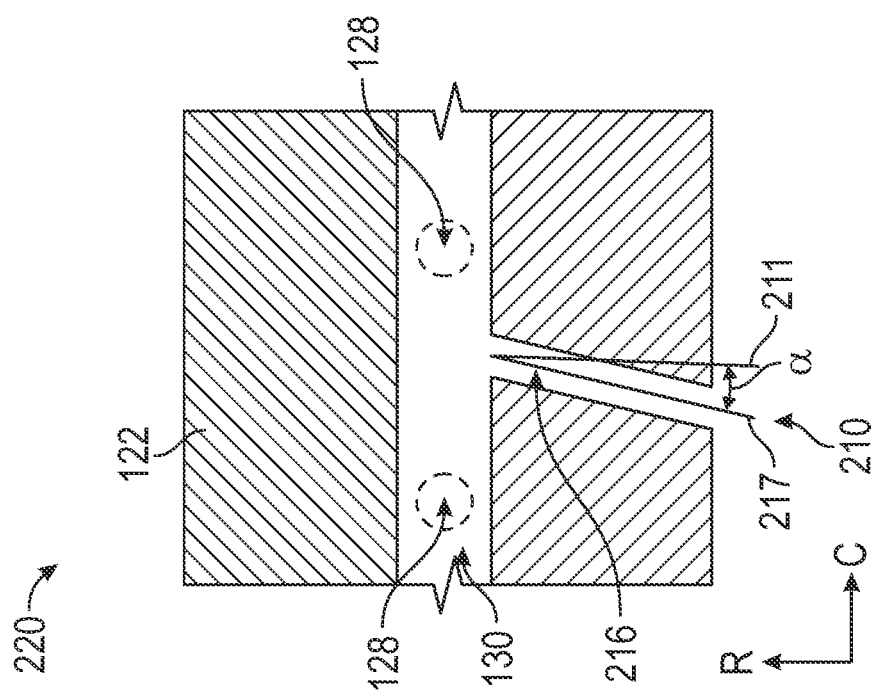
FIG. 7 is a schematic partial cross-sectional view of a variable fuel flow system for the fuel injector manifold, taken along a longitudinal centerline axis of the fuel injector manifold, according to another embodiment.

FIG. 7 is a schematic partial cross-sectional view of a variable fuel flow system 220 for the fuel injector manifold 100 (FIG. 2), taken along a longitudinal centerline axis of the fuel injector manifold 100, according to another embodiment. The variable fuel flow system 220 is substantially similar to the variable fuel flow system 120 of FIGS. 3A to 6B. The same reference numerals will be used for components of the variable fuel flow system 220 that are the same as or similar to the components of the variable fuel flow system 120 discussed above. The description of these components above also applies to this embodiment, and a detailed description of these components is omitted here.

The variable fuel flow system 220 includes a fuel injector 210 having a fuel injector flowpath 216 that is different than the fuel injector flowpath 116 of FIGS. 3A to 6B. In particular, the fuel injector flowpath 216 is disposed at a circumferential fuel injector flowpath angle $\alpha$ with respect to a lateral centerline axis 211 of the fuel injector manifold 100 in the circumferential direction C. In particular, a lateral centerline axis 217 of the fuel injector flowpath 216 is disposed at the circumferential fuel injector flowpath angle $\alpha$ with respect to the lateral centerline axis 211. The circumferential fuel injector flowpath angle $\alpha$ is non-zero. For example, the circumferential fuel injector flowpath angle $\alpha$ can be greater than or less than zero. In some embodiments, the circumferential fuel injector flowpath angle $\alpha$ is in a range of negative sixty degrees to sixty degrees. In operation, the fuel injector flowpath 216 injects the fuel 67 at the circumferential fuel injector flowpath angle $\alpha$ into the combustor 26 (FIG. 1).

Figure 8:
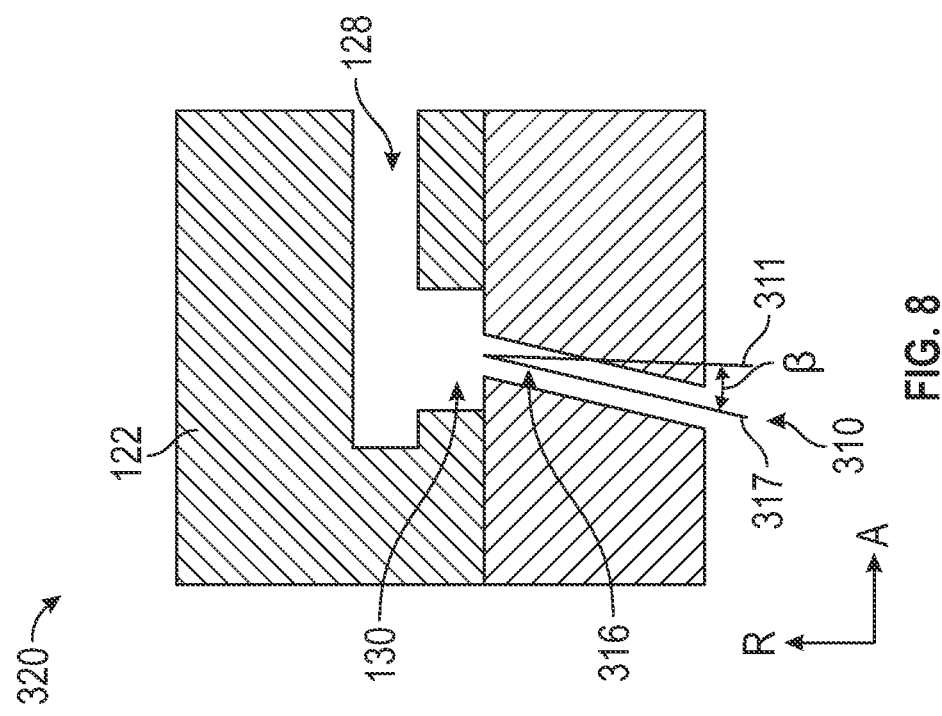
FIG. 8 is schematic partial cross-sectional view of a variable fuel flow system for the fuel injector manifold, taken along a lateral centerline axis of the fuel injector manifold, according to another embodiment.

FIG. 8 is schematic partial cross-sectional view of a variable fuel flow system 320 for the fuel injector manifold 100 (FIG. 2), taken along a lateral centerline axis of the fuel injector manifold 100, according to another embodiment. The variable fuel flow system 320 is substantially similar to the variable fuel flow system 120 of FIGS. 3A to 6B. The same reference numerals will be used for components of the variable fuel flow system 320 that are the same as or similar to the components of the variable fuel flow system 120 discussed above. The description of these components above also applies to this embodiment, and a detailed description of these components is omitted here.

The variable fuel flow system 320 includes a fuel injector 310 having a fuel injector flowpath 316 that is different than the fuel injector flowpath 116 of FIGS. 3A to 6B. In particular, the fuel injector flowpath 316 is disposed at an axial fuel injector flowpath angle $\beta$ with respect to a lateral centerline axis 311 of the fuel injector manifold 100 in the axial direction A. In particular, a lateral centerline axis 317 of the fuel injector flowpath 316 is disposed at the axial fuel injector flowpath angle $\beta$ with respect to the lateral centerline axis 311. The axial fuel injector flowpath angle $\beta$ is non-zero. For example, the axial fuel injector flowpath angle $\beta$ can be greater than or less than zero. In some embodiments, the axial fuel injector flowpath angle $\beta$ is in a range of negative sixty degrees to sixty degrees. In operation, the fuel injector flowpath 216 injects the fuel 67 at the axial fuel injector flowpath angle $\beta$ into the combustor 26 (FIG. 1).

Figure 9B:
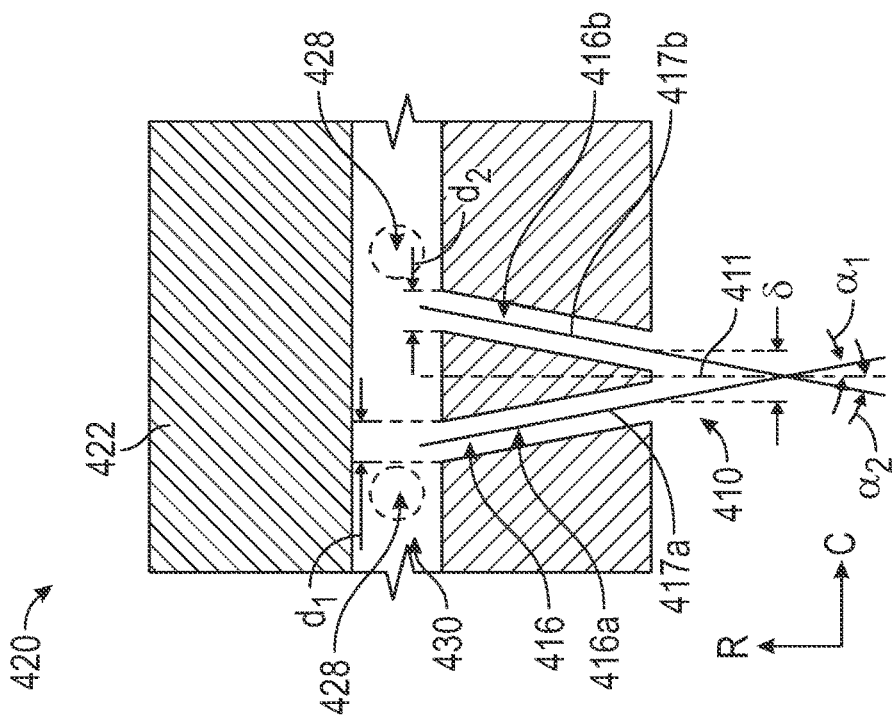
FIG. 9B is a schematic partial cross-sectional view of the fuel injector manifold of FIG. 9A, taken at section line 9B-9B in FIG. 9A, according to the present disclosure.
Figure 9A:
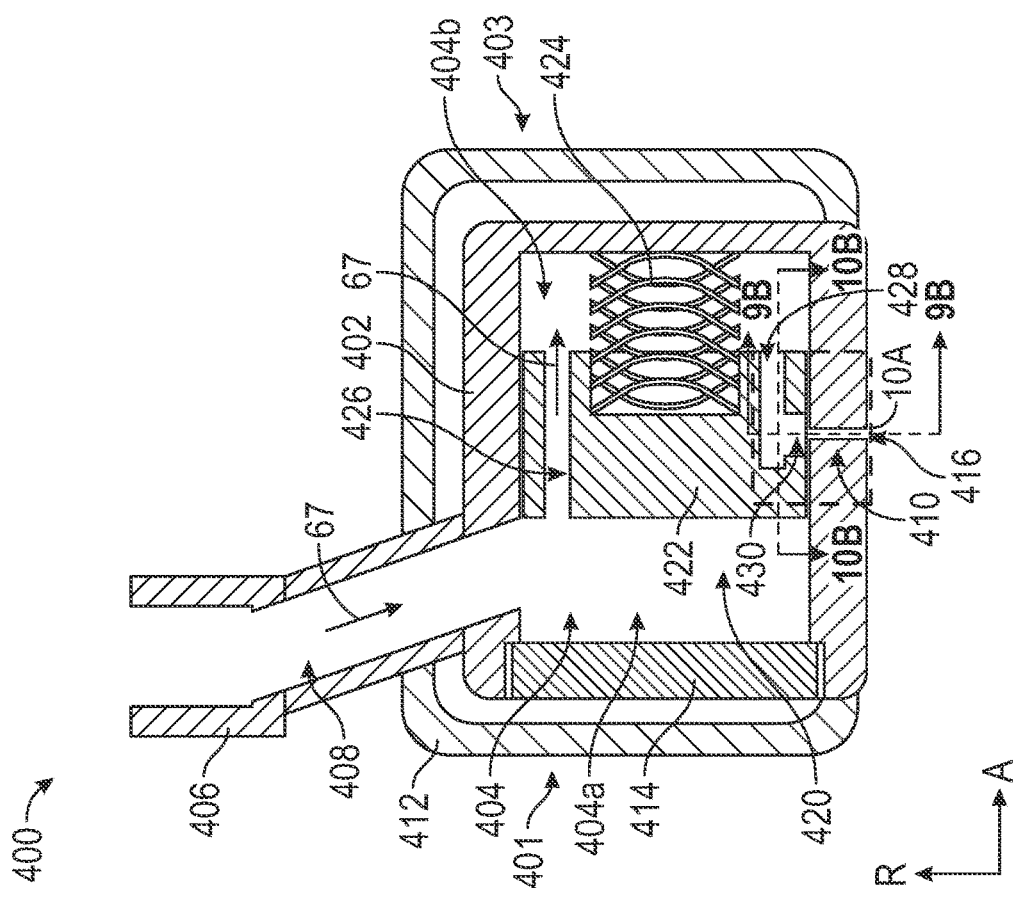
FIG. 9A is a schematic partial cross-sectional view of a fuel injector manifold, taken along a lateral centerline axis of the fuel injector manifold, according to another embodiment.

FIG. 9A is a schematic partial cross-sectional view of a fuel injector manifold 400, taken along a lateral centerline axis of the fuel injector manifold 400, according to another embodiment. FIG. 9B is a schematic partial cross-sectional view of the fuel injector manifold 400, taken at section line 9B-9B in FIG. 9A, according to the present disclosure. The fuel injector manifold 400 is substantially similar to the fuel injector manifold 100 of FIGS. 3A to 6B. The same reference numerals or similar reference numerals will be used for components of the fuel injector manifold 400 that are the same as or similar to the components of the fuel injector manifold 100 discussed above. The description of these components above also applies to this embodiment, and a detailed description of these components and the function of these components is omitted here.

The fuel injector manifold 400 extends axially between an aft end 401 and a forward end 403. The fuel injector manifold 400 includes a fuel manifold ring 402, a fuel manifold flowpath 404 having an upstream fuel manifold flowpath 404a and a downstream fuel manifold flowpath 404b, a fuel manifold inlet 406, a fuel manifold inlet flowpath 408, a plurality of fuel injectors 410, a fuel manifold heat shield 412, a plug 414, and a variable fuel flow system 420. The plurality of fuel injectors 410 each includes a plurality of fuel injector flowpaths 416 that is different than the fuel injector flowpath 116 of FIGS. 3A to 6B, as detailed further below. The variable fuel flow system 420 includes a piston 422, an actuation mechanism 424, and one or more piston flowpaths 426, 428, and 430, including one or more first piston flowpaths 426, one or more second piston flowpaths 428, and one or more third piston flowpaths 430. The plurality of fuel injector flowpaths 416 includes oval shaped flowpaths. The plurality of fuel injector flowpaths 416 can be circular shaped, slits, or any shape for directing the fuel 67 therethrough.

As shown in FIG. 9B, the plurality of fuel injector flowpaths 416 includes a first fuel injector flowpath 416a and a second fuel injector flowpath 416b. The first fuel injector flowpath 416a includes a first fuel injector flowpath diameter $d_1$ and the second fuel injector flowpath 416b includes a second fuel injector flowpath diameter $d_2$. In FIG. 9B, the first fuel injector flowpath diameter $d_1$ is equal to the second fuel injector flowpath 416b. In some embodiments, the first fuel injector flowpath diameter $d_1$ is greater than or less than the second fuel injector flowpath diameter $d_2$. The first fuel injector flowpath 416a and the second fuel injector flowpath 416b are angled towards each other in the circumferential direction C. In this way, the fuel 67 through the first fuel injector flowpath 416a impinges with the fuel 67 through the second fuel injector flowpath 416b to atomize the fuel 67 into a fine mist and the fine mist of the fuel 67 is injected from each of the plurality of fuel injectors 410. In particular, the fuel 67 injected from the first fuel injector flowpath 416a and the second fuel injector flowpath 416b combine to generate a fuel stream from each of the plurality of fuel injectors 410. The first fuel injector flowpath 416a is disposed at a first circumferential fuel injector angle $\alpha_1$ with respect to a lateral centerline axis 411 of the fuel injector manifold 400 in the circumferential direction C. In particular, a first lateral centerline axis 417a of the first fuel injector flowpath 416a is disposed at the first circumferential fuel injector flowpath angle $\alpha_1$ with respect to the lateral centerline axis 411. The second fuel injector flowpath 416b is disposed at a second circumferential fuel injector angle $\alpha_2$ with respect to the lateral centerline axis 411 of the fuel injector manifold 400 in the circumferential direction C. In particular, a second lateral centerline axis 417b of the second fuel injector flowpath 416b is disposed at the second circumferential fuel injector flowpath angle $\alpha_2$ with respect to the lateral centerline axis 411.

The first circumferential fuel injector flowpath angle $\alpha_1$ and the second circumferential fuel injector flowpath angle $\alpha_2$ are non-zero (e.g., greater than or less than zero). The first circumferential fuel injector flowpath angle $\alpha_1$ and the second circumferential fuel injector flowpath angle $\alpha_2$ are each in a range of ten degrees to sixty degrees. The second circumferential fuel injector flowpath angle $\alpha_2$ is opposite the first circumferential fuel injector flowpath angle $\alpha_1$ such that the first fuel injector flowpath 416a and the second fuel injector flowpath 416b are angled toward each other in the circumferential direction C. The first fuel injector flowpath 416a is spaced from the second fuel injector flowpath 416b in the circumferential direction C such that the first lateral centerline axis 417a of the first fuel injector flowpath 416a and the second lateral centerline axis 417b of the second fuel injector flowpath 416b are offset by a fuel injector flowpath circumferential distance $\delta$, where $\delta$ may range from one half times $(d_1+d_2)$ to ten times $(d_1+d_2)$. The first circumferential fuel injector flowpath angle $\alpha_1$, the second circumferential fuel injector flowpath angle $\alpha_2$ and the fuel injector flowpath circumferential distance $\delta$ are selected such that the fuel jets from the fuel injectors 410 may impinge upon one another to enhance atomization, mixing with the airflow, or both atomization and mixing with the airflow.

Figure 10B:
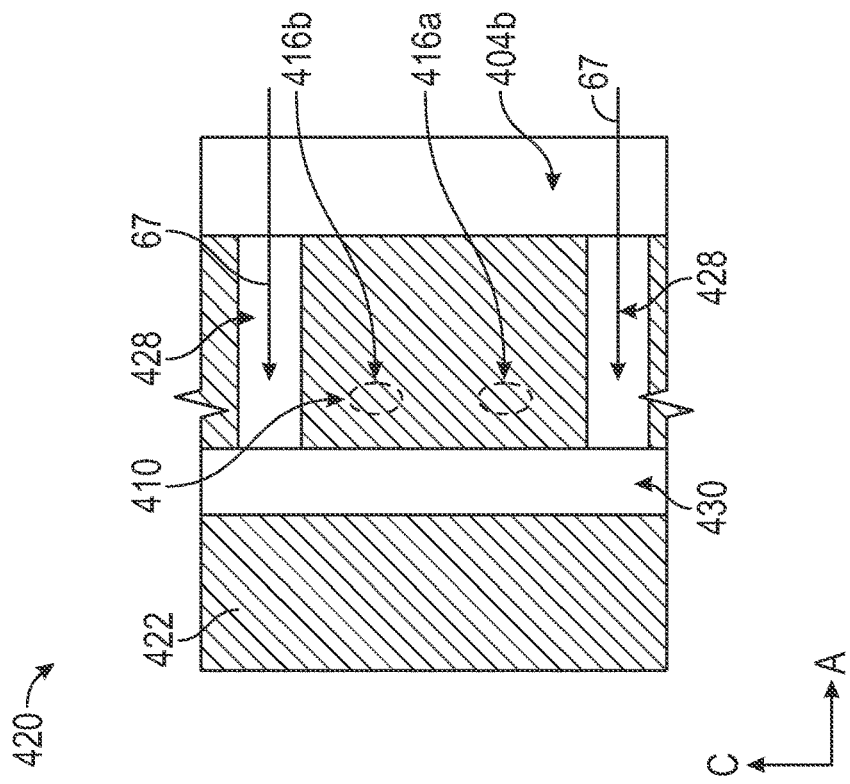
FIG. 10B is a schematic partial cross-sectional view of the fuel injector manifold of FIG. 9A, taken at section line 10B-10B in FIG. 9A, and with the variable fuel flow system of the fuel injector manifold in the closed state, according to the present disclosure.
Figure 10A:
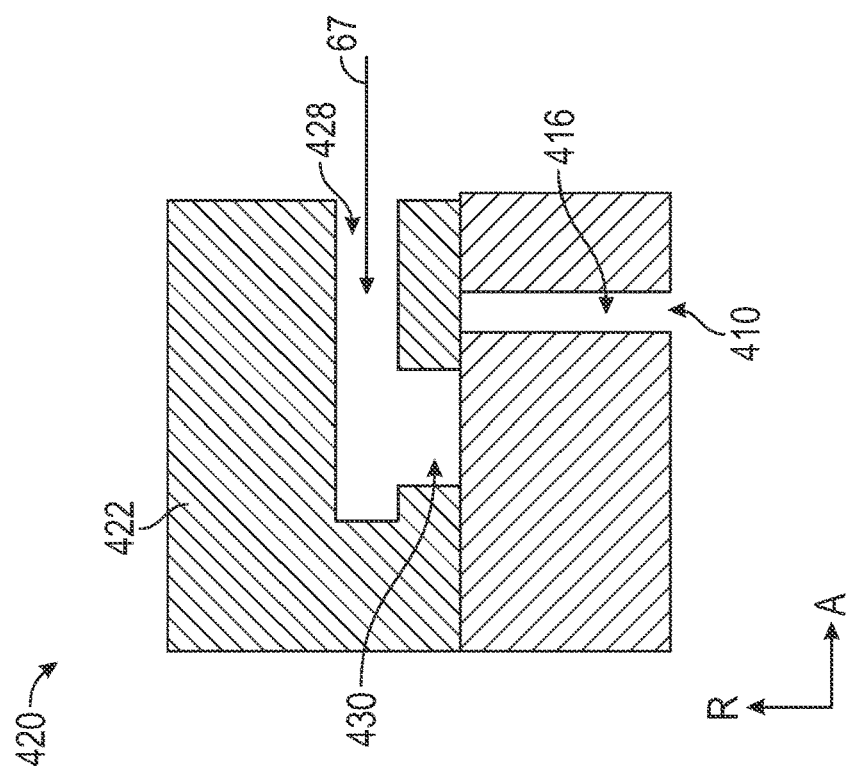
FIG. 10A is a schematic partial cross-sectional view of the fuel injector manifold of FIG. 9A, taken at detail 10A in FIG. 9A, and with a variable fuel flow system of the fuel injector manifold in a closed state, according to the present disclosure.
Figure 12B:
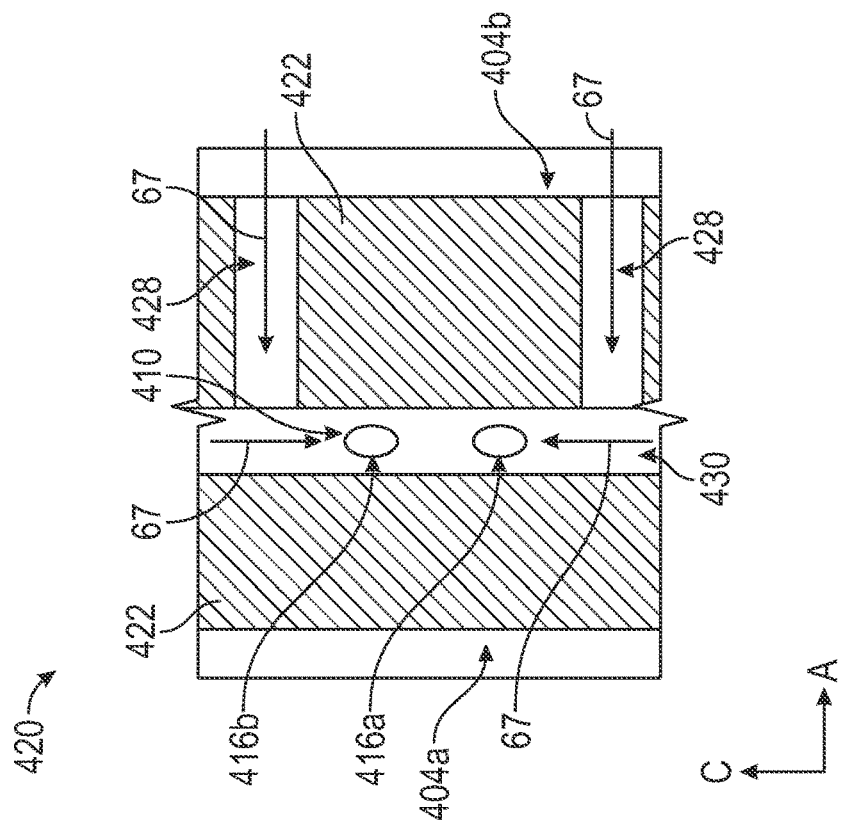
FIG. 12B is a schematic partial cross-sectional view of the fuel injector manifold of FIGS. 10B and 11B, and with the variable fuel flow system of the fuel injector manifold in the fully opened state, according to the present disclosure.
Figure 12A:
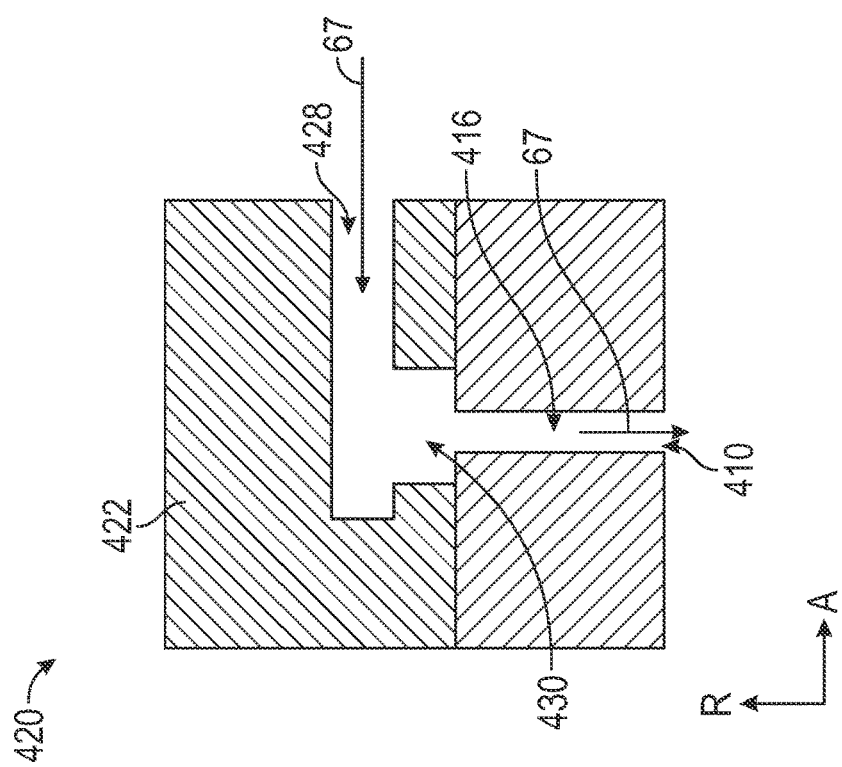
FIG. 12A is a schematic partial cross-sectional view of the fuel injector manifold of FIGS. 10A and 11A, and with the variable fuel flow system of the fuel injector manifold in a fully opened state, according to the present disclosure.

FIG. 10A is a schematic cross-sectional view of the fuel injector manifold 400, taken at detail 10A in FIG. 9A, and with the variable fuel flow system 420 in a closed state. FIGS. 11A and 12A are schematic cross-sectional views of the fuel injector manifold 400 of FIG. 10A and with the variable fuel flow system 420 in a partially opened state (FIG. 11A) and in a fully opened state (FIG. 12A), respectively, according to the present disclosure. FIG. 10B is a schematic cross-sectional view of the fuel injector manifold 400, taken at section line 10B-10B in FIG. 9A, and with the variable fuel flow system 420 in the closed state. FIGS. 11B and 12B are schematic cross-sectional views of the fuel injector manifold 400 of FIG. 10B and with the variable fuel flow system 420 in the partially opened state (FIG. 11B) and in the fully opened state (FIG. 12B), respectively, according to the present disclosure. The fuel injector manifold 400 operates substantially similar as does the fuel injector manifold 100 of FIGS. 3A to 6B, detailed above. The variable fuel flow system 420 starts in the closed state (FIGS. 10A and 10B) when there is no or minimal fuel 67 flow. The fuel injector manifold 400 (FIG. 9A) directs the fuel 67 through the fuel manifold flowpath 404 (FIG. 9A) to push the piston 422, and the variable fuel flow system 420 is in the partially opened state (FIGS. 11A and 11B) when the one or more third piston flowpaths 430 are partially axially aligned with the plurality of fuel injector flowpaths 416. In this way, the one or more third piston flowpaths 430 direct a portion of the fuel 67 into the plurality of fuel injector flowpaths 416 (e.g., into the first fuel injector flowpath 416a and the second fuel injector flowpath 416b).

The plurality of fuel injector flowpaths 416 directs the portion of the fuel 67 therethrough. In particular, the first fuel injector flowpath 416a directs the portion of the fuel 67 at the first circumferential fuel injector flowpath angle $\alpha_1$ (FIG. 9B), and the second fuel injector flowpath 416b directs the portion of the fuel 67 at the second fuel injector flowpath angle $\alpha_2$ (FIG. 9B). In this way, the fuel 67 from the first fuel injector flowpath 416a intersects with the fuel 67 from the second fuel injector flowpath 416b to generate the fuel stream from each of the plurality of fuel injectors 410.

As the fuel 67 continues to flow into the upstream fuel manifold flowpath 404a (FIG. 9A), the piston 422 moves such that the one or more third piston flowpaths 430 completely align with the plurality of fuel injector flowpaths 416. In this way, the variable fuel flow system 420 is in the fully opened state (FIGS. 12A and 12B), and more fuel 67 is injected through the plurality of fuel injector flowpaths 416 as compared to the partially opened state. In particular, the first fuel injector flowpath 416a directs the fuel 67 at the first circumferential fuel injector flowpath angle $\alpha_1$ (FIG. 9B), and the second fuel injector flowpath 416b directs the portion of the fuel 67 at the second fuel injector flowpath angle $d_2$ (FIG. 9B). In this way, the fuel 67 from the first fuel injector flowpath 416a intersects with the fuel 67 from the second fuel injector flowpath 416b to generate the fuel stream from each of the plurality of fuel injectors 410.

FIG. 13 is schematic partial cross-sectional view of a variable fuel flow system 520 for the fuel injector manifold 400 (FIG. 9A), taken along a lateral centerline axis of the fuel injector manifold 400, according to another embodiment. The variable fuel flow system 520 is substantially similar to the variable fuel flow system 420 of FIGS. 9A to 12B. The same reference numerals will be used for components of the variable fuel flow system 520 that are the same as or similar to the components of the variable fuel flow system 420 discussed above. The description of these components above also applies to this embodiment, and a detailed description of these components is omitted here.

The variable fuel flow system 520 includes a fuel injector 510 having a plurality of fuel injector flowpaths 516 that is different than the plurality of fuel injector flowpaths 416 of FIGS. 9A to 12B. In particular, each of the plurality of fuel injector flowpaths 516 is disposed at an axial fuel injector flowpath angle $\beta$ with respect to a lateral centerline axis 511 of the fuel injector manifold 400 in the axial direction A. In particular, a lateral centerline axis 517 of each of the plurality of fuel injector flowpaths 516 is disposed at the axial fuel injector flowpath angle with respect to the lateral centerline axis 511. The axial fuel injector flowpath angle $\beta$ is non-zero. For example, the axial fuel injector flowpath angle $\beta$ can be greater than or less than zero. In some embodiments, the axial fuel injector flowpath angle $\beta$ is in a range of negative sixty degrees to sixty degrees. In operation, each of the plurality of fuel injector flowpaths 516 injects the fuel 67 at the axial fuel injector flowpath angle $\beta$ into the combustor 26 (FIG. 1).

Figure 14C:
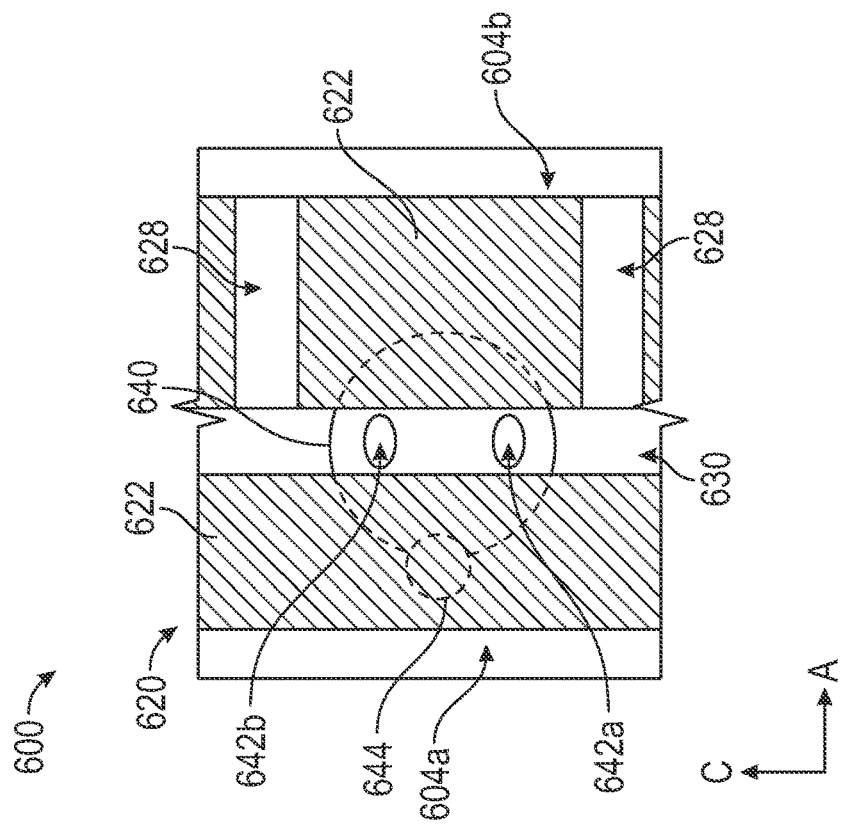
FIG. 14C is a schematic partial cross-sectional view of the fuel injector manifold of FIG. 14A, taken at section line 14C-14C in FIG. 14A, according to the present disclosure.
Figure 14B:
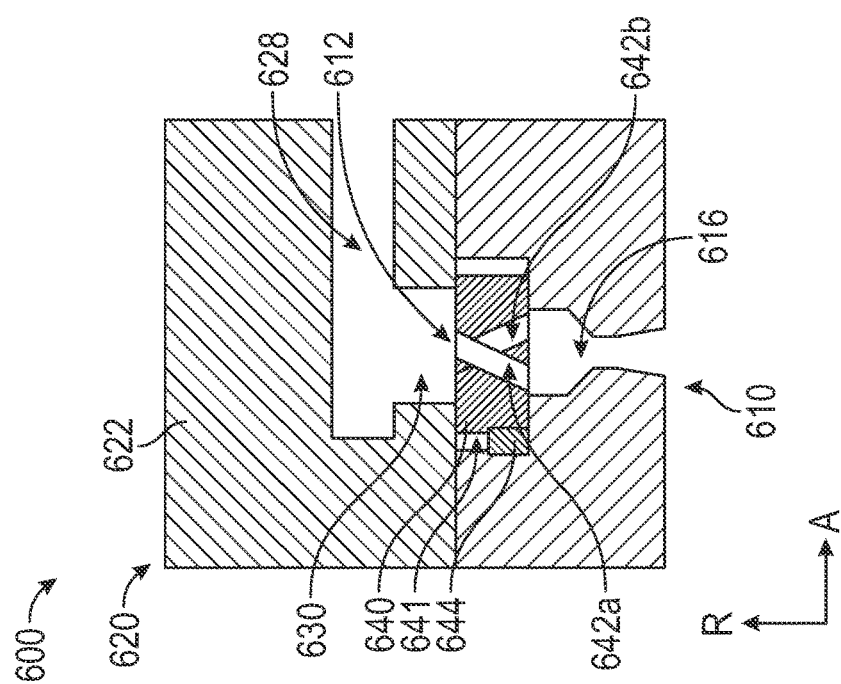
FIG. 14B is a schematic partial cross-sectional view of the fuel injector manifold of FIG. 14A, taken at detail 14B in FIG. 14A, according to the present disclosure.

FIG. 14A is a schematic partial cross-sectional view of a fuel injector manifold 600, taken along a lateral centerline axis of the fuel injector manifold 600, according to another embodiment. FIG. 14B is a schematic partial cross-sectional view of the fuel injector manifold 600, taken at detail 14B in FIG. 14A, according to the present disclosure. FIG. 14C is a schematic partial cross-sectional view of the fuel injector manifold 600, taken at section line 14C-14C in FIG. 14A, according to the present disclosure. The fuel injector manifold 600 is substantially similar to the fuel injector manifold 100 of FIGS. 3A to 6B. The same reference numerals or similar reference numerals will be used for components of the fuel injector manifold 600 that are the same as or similar to the components of the fuel injector manifold 100 (FIG. 2) discussed above. The description of these components above also applies to this embodiment, and a detailed description of these components and the function of these components is omitted here.

The fuel injector manifold 600 extends axially between an aft end 601 and a forward end 603. The fuel injector manifold 600 includes a fuel manifold ring 602, a fuel manifold flowpath 604 having an upstream fuel manifold flowpath 604a and a downstream fuel manifold flowpath 604b, a fuel manifold inlet 606, a fuel manifold inlet flowpath 608, a plurality of fuel injectors 610, a fuel manifold heat shield 612, a plug 614, and a variable fuel flow system 620. The plurality of fuel injectors 610 each includes a fuel injector flowpath 616 that is different than the fuel injector flowpath 116 of FIGS. 3A to 6B, as detailed further below. The variable fuel flow system 620 includes a piston 622, an actuation mechanism 624, and one or more piston flowpaths 626, 628, and 630 including one or more first piston flowpaths 626, one or more second piston flowpaths 628, and one or more third piston flowpaths 630. The fuel injector manifold 600 further includes a pressure atomizer 640 that atomizes the fuel 67 into a fine mist through the fuel injector flowpath 616.

As shown in FIG. 14B, the pressure atomizer 640 is disposed within an atomizer cavity 641 of the fuel injector 610. The atomizer cavity 641 is disposed radially between the piston 622 and the fuel injector flowpath 616. The fuel injector flowpath 616 is a converging-diverging flowpath. In particular, the fuel injector flowpath 616 is converging and diverging as the fuel injector flowpath 616 extends from a radially outer end (e.g., an end closer to the pressure atomizer 640) to a radially inner end (e.g., an end closer to the combustor 26 (FIG. 1)) of the fuel injector 610.

As shown in FIGS. 14B and 14C, the pressure atomizer 640 includes a plurality of atomizer flowpaths 642 in fluid communication with the one or more third piston flowpaths 630 and the fuel injector flowpath 616. The plurality of atomizer flowpaths 642 includes oval shaped flowpaths. The plurality of atomizer flowpaths 642 can be circular shaped, slits, or any shape for directing the fuel 67 therethrough.

The plurality of atomizer flowpaths 642 includes a first atomizer flowpath 642a and a second atomizer flowpath 642b. The first atomizer flowpath 642a is circumferentially spaced in the circumferential direction C from the second atomizer flowpath 642b. The first atomizer flowpath 642a is axially aligned with the second atomizer flowpath 642b at a radially outer end (e.g., an end closer to the one or more third piston flowpaths 630) of the pressure atomizer 640 in the axial direction A. The first atomizer flowpath 642a and the second atomizer flowpath 642b are angled away from each other in the axial direction A. In particular, the first atomizer flowpath 642a is angled axially aftward as the first atomizer flowpath 642a extends from the radially outer end of the pressure atomizer 640 to a radially inner end of the pressure atomizer 640 (e.g., an end closer to the fuel injector flowpath 616). The second atomizer flowpath 642b is angled axially forward as the second atomizer flowpath 642b extends from the radially outer end to the radially inner end of the pressure atomizer 640. In this way, the first atomizer flowpath 642a is axially spaced in the axial direction A from the second atomizer flowpath 642b at a radially inner end of the pressure atomizer 640. An atomizer plug 644 is disposed within the atomizer cavity 641 and contacts the pressure atomizer 640 to prevent the pressure atomizer 640 from rotating during operation.

FIGS. 15A, 16A, and 17A are schematic cross-sectional views of the fuel injector manifold 600 of FIG. 14B, and with the variable fuel flow system 620 in a closed state (FIG. 15A), in a partially opened state (FIG. 16A), and in a fully opened state (FIG. 17A), respectively, according to the present disclosure. FIGS. 15B, 16B, and 17B are schematic cross-sectional views of the fuel injector manifold 600 of FIG. 14C, and with the variable fuel flow system 620 in the closed state (FIG. 15B), in the partially opened state (FIG. 16B), and in the fully opened state (FIG. 17B), respectively, according to the present disclosure. The fuel injector manifold 600 operates substantially similar as does the fuel injector manifold 100 of FIGS. 3A to 6B, detailed above. The variable fuel flow system 620 starts in the closed state (FIGS. 15A and 15B) when there is no or little fuel 67 flow. The fuel injector manifold 600 directs the fuel 67 through the fuel manifold flowpath 604 to push the piston 622, and the variable fuel flow system 620 is in the partially opened state (FIGS. 16A and 16B) when the one or more third piston flowpaths 630 are partially axially aligned with the plurality of atomizer flowpaths 642. In this way, the one or more third piston flowpaths 430 direct a portion of the fuel 67 into the plurality of atomizer flowpaths 642 (e.g., into the first atomizer flowpath 642a and the second atomizer flowpath 642b). The plurality of atomizer flowpaths 642 directs the fuel 67 into the fuel injector flowpath 616. The fuel 67 is forced through the plurality of atomizer flowpaths 642 under high pressure to atomizer the fuel 67 into a fine mist. The first atomizer flowpath 642a directs the fuel 67 axially aftward into the fuel injector flowpath 616. The second atomizer flowpath 642b directs the fuel 67 axially forward into the fuel injector flowpath 616. The fuel injector flowpath 616 directs the fine mist of the fuel 67 therethrough and into the combustor 26 (FIG. 1). The converging-diverging flowpath of the fuel injector flowpath 616 helps to generate the high pressure of the fuel 67 to encourage the atomization of the fuel 67 as the fuel 67 flows through the plurality of atomizer flowpaths 642.

As the fuel 67 continues to flow into the upstream fuel manifold flowpath 604a, the piston 622 moves such that the one or more third piston flowpaths 630 completely align with the plurality of atomizer flowpaths 642. In this way, the variable fuel flow system 620 is in the fully opened state (FIGS. 17A and 17B), and more fuel 67 is injected through the plurality of atomizer flowpaths 642 as compared to the partially opened state. In particular, the first atomizer flowpath 642a directs the fuel 67 axially aftward, and the second atomizer flowpath 642b directs the fuel 67 axially forward into the fuel injector flowpath 616. In this way, the pressure atomizer 640 atomizes the fuel 67 into the fine mist, and the fuel injector flowpath 616 injects the fine mist into the combustor 26 (FIG. 1).

Figure 18A:
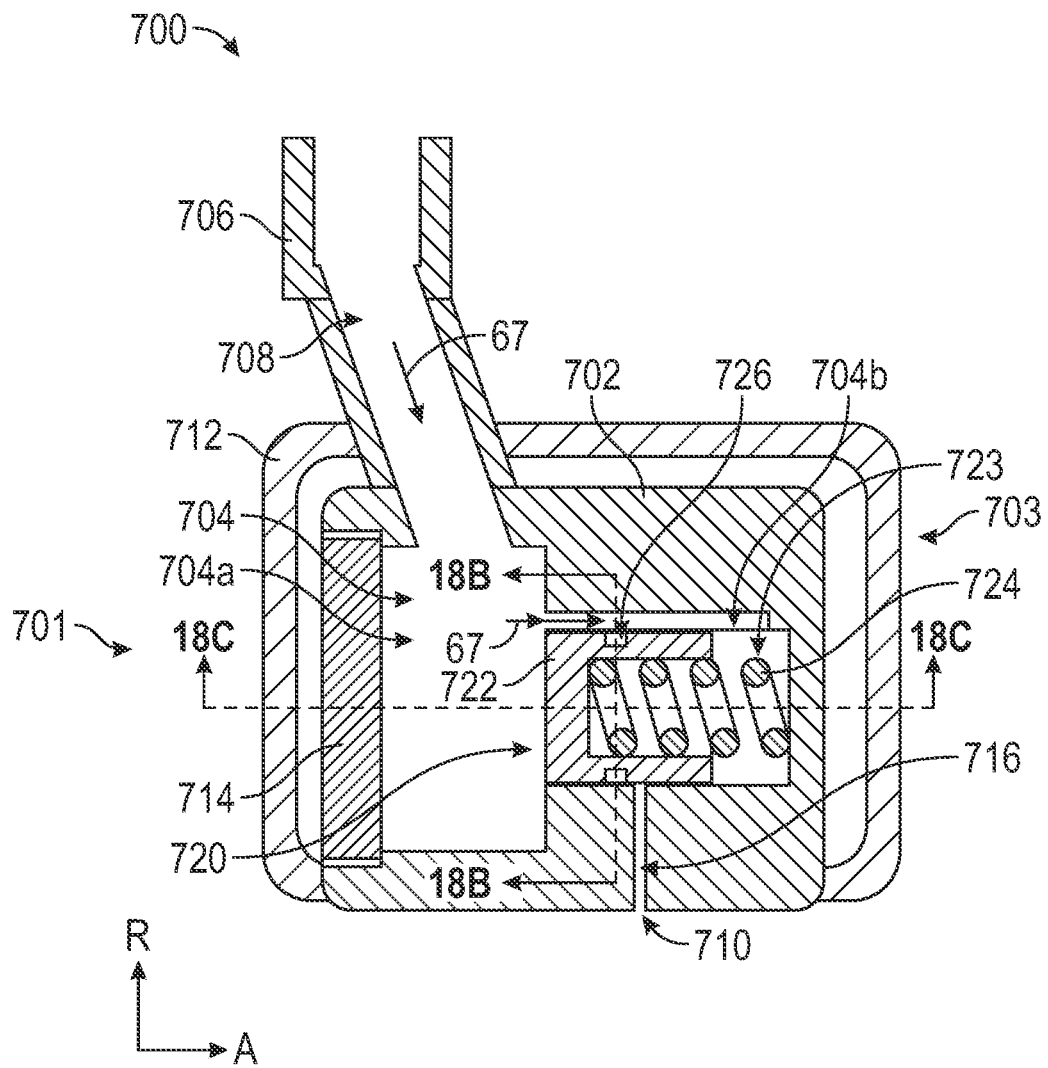
FIG. 18A is a schematic partial cross-sectional view of a fuel injector manifold, taken along a lateral centerline axis of the fuel injector manifold, according to another embodiment.
Figure 18B:
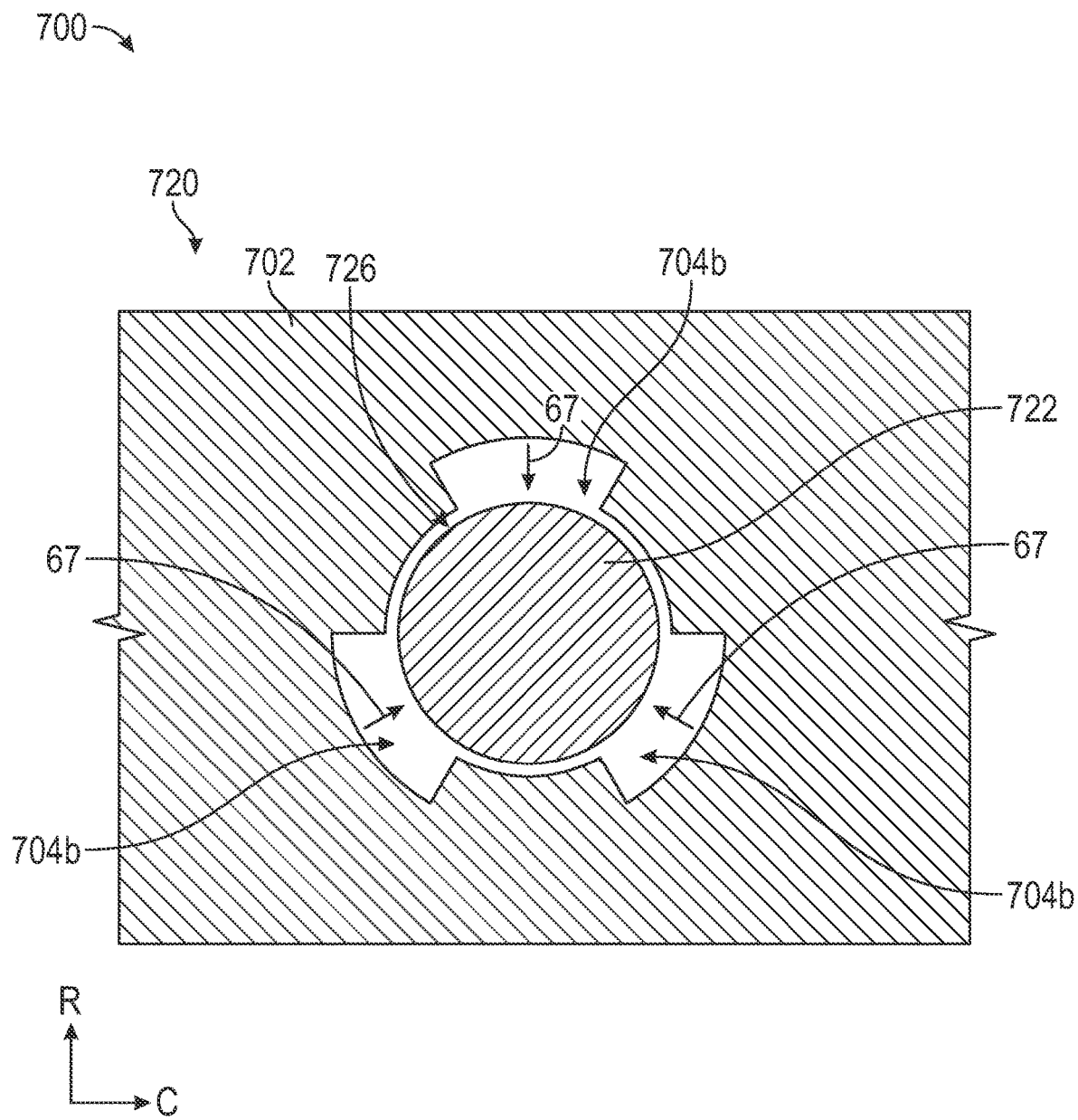
FIG. 18B is a schematic partial cross-sectional view of the fuel injector manifold of FIG. 18A, taken along section line 18B-18B in FIG. 18A, according to the present disclosure.

FIG. 18A is a schematic partial cross-sectional view of a fuel injector manifold 700, taken along a lateral centerline axis of the fuel injector manifold 700, according to another embodiment. FIG. 18B is a schematic partial cross-sectional view of the fuel injector manifold 700, taken along section line 18B-18B in FIG. 18A, according to the present disclosure. FIG. 18C is a schematic partial cross-sectional view of the fuel injector manifold 700, taken along section line 18C-18C in FIG. 18A, according to the present disclosure. The fuel injector manifold 700 is substantially similar to the fuel injector manifold 100 of FIGS. 3A to 6B. The same reference numerals or similar reference numerals will be used for components of the fuel injector manifold 700 that are the same as or similar to the components of the fuel injector manifold 100 discussed above. The description of these components above also applies to this embodiment, and a detailed description of these components and the function of these components is omitted here.

The fuel injector manifold 700 extends axially between an aft end 701 and a forward end 703. The fuel injector manifold 700 includes a fuel manifold ring 702, a fuel manifold flowpath 704 having an upstream fuel manifold flowpath 704a and one or more downstream fuel manifold flowpaths 704b, a fuel manifold inlet 706, a fuel manifold inlet flowpath 708, a plurality of fuel injectors 710, a fuel manifold heat shield 712, a plug 714, and a variable fuel flow system 720. The upstream fuel manifold flowpath 704a is annular about the fuel manifold ring 702. The one or more downstream fuel manifold flowpaths 704b are discrete flowpaths and are in fluid communication with the upstream fuel manifold flowpath 704a and extend axially from the upstream fuel manifold flowpath 704a towards the forward end 703 of the fuel manifold ring 702. As shown in FIG. 18B, the one or more downstream fuel manifold flowpaths 704b include three downstream fuel manifold flowpaths 704b that are spaced circumferentially about a piston 722. The one or more downstream fuel manifold flowpaths 704b, however, can include any number of downstream fuel manifold flowpaths 704b. The plurality of fuel injectors 710 each includes a fuel injector flowpath 716. The variable fuel flow system 720 is different than the variable fuel flow system 120 of FIGS. 3A to 6B.

The variable fuel flow system 720 includes a plurality of pistons 722 and a plurality of piston cavities 723. The plurality of piston cavities 723 includes discrete cavities defined in the fuel manifold ring 702 and is spaced circumferentially about the fuel manifold ring 702. The plurality of pistons 722 includes discrete pistons (rather than an annular piston) and the plurality of pistons 722 is spaced circumferentially about the fuel manifold flowpath 704. In particular, a respective one of the plurality of pistons 722 is associated with a respective one of the plurality of fuel injectors 710. The plurality of pistons 722 is disposed within the plurality of piston cavities 723. In particular, a respective one of the plurality of pistons 722 is disposed within a respective one of the plurality of piston cavities 723.

The plurality of pistons 722 includes one or more actuation mechanisms 724 and one or more piston flowpaths 726. The actuation mechanisms 724 are springs, and, particularly, are compression springs or tension springs. In this way, the actuation mechanisms 724 are passive actuation mechanisms that bias the respective piston 722 aftward. As the piston 722 moves forward, the actuation mechanisms 724 contract (e.g., compress) and store potential energy. The actuation mechanisms 724 release the potential energy to move the respective piston 722 axially aftward. Thus, each of the plurality of pistons 722 can move to vary the flow of the fuel 67 through the plurality of fuel injectors 710. In some embodiments, the one or more actuation mechanisms 724 include one actuation mechanism 724 that is annular about the fuel injector manifold 700 and coupled to each of the plurality of pistons 722. In some embodiments, the one or more actuation mechanisms 724 include a plurality of actuation mechanisms 724 and a respective one of the actuation mechanisms 724 is coupled to a respective one of the plurality of pistons 722. Each of the plurality of actuation mechanisms 724 can have different spring constants or can move each of the plurality of pistons 722 at a different rate. In this way, each of the plurality of pistons 722 can move at a different rate to vary the fuel 67 delivery circumferentially about the fuel manifold ring 702 at different power conditions. The actuation mechanisms 724 can be any of the actuation mechanisms detailed herein.

As shown in FIG. 18B, the one or more piston flowpaths 726 are annular about the respective piston 722. The one or more piston flowpaths 726 are in fluid communication with the one or more fuel manifold flowpaths 704b. The one or more piston flowpaths 726 are in fluid communication with the fuel injector flowpath 716 when the respective piston 722 moves and the one or more piston flowpaths 726 are partially aligned or fully aligned with the fuel injector flowpath 716.

As shown in FIG. 18C, the variable fuel flow system 720 also includes one or more seals 750 for sealing a space between the respective piston 722 and sides of the fuel manifold ring 702. In particular, the one or more seals 750 seal a respective piston cavity 723. The one or more seals 750 prevent the fuel 67 from flowing past the respective piston 722 through the space between the respective piston 722 and the sides of the fuel manifold ring 702. In this way, the one or more seals 750 prevent the fuel 67 from flowing into the respective piston cavity 723.

FIGS. 19 and 20 are schematic cross-sectional views of the fuel injector manifold 700 with the variable fuel flow system 720 in a partially opened state (FIG. 19) and in a fully opened state (FIG. 20), respectively, according to the present disclosure. FIG. 18A shows the variable fuel flow system 720 in a closed state. The fuel injector manifold 700 operates substantially similar as does the fuel injector manifold 100 of FIGS. 3A to 6B, detailed above. The variable fuel flow system 720 starts in the closed state (FIG. 18A) when there is no or little fuel 67 flow. The fuel injector manifold 700 directs the fuel 67 through the fuel manifold flowpath 704 to push each of the plurality of pistons 722, and the variable fuel flow system 720 is in the partially opened state (FIG. 19) when the one or more piston flowpaths 726 are partially axially aligned with the fuel injector flowpath 716. In particular, the one or more downstream fuel manifold flowpaths 704b direct the fuel 67 into the one or more piston flowpaths 726. The one or more piston flowpaths 726 direct the fuel 67 circumferentially about the one or more piston flowpaths 726 and into the fuel injector flowpath 716. In this way, the one or more piston flowpaths 726 direct a portion of the fuel 67 into the fuel injector flowpath 716. The fuel injector flowpath 716 directs the portion of the fuel 67 therethrough to inject the portion of the fuel 67 into the combustor 26 (FIG. 1).

As the fuel 67 continues to flow into the upstream fuel manifold flowpath 704a, each of the plurality of pistons 722 moves such that the one or more piston flowpaths 726 completely align with the fuel injector flowpath 716. In this way, the variable fuel flow system 720 is in the fully opened state (FIG. 20), and more fuel 67 is injected through the fuel injector flowpath 716 as compared to the partially opened state.

Figure 21:
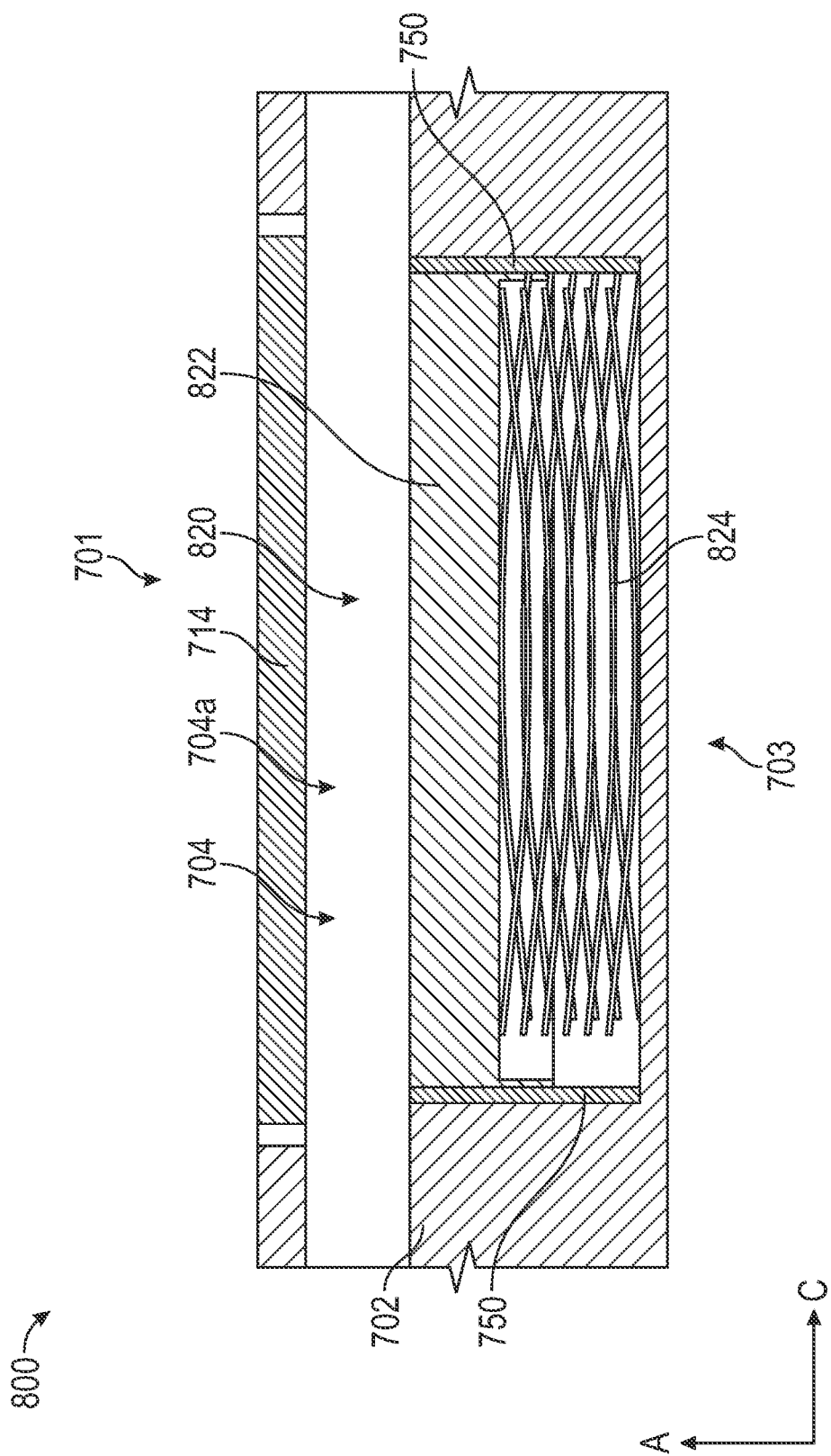
FIG. 21 is a schematic partial cross-sectional top view of a fuel injector manifold, taken along a longitudinal axis of the fuel injector manifold, according to another embodiment.

FIG. 21 is a schematic partial cross-sectional top view of a fuel injector manifold 800, taken along a longitudinal axis of the fuel injector manifold 800, according to another embodiment. The fuel injector manifold 800 is substantially similar to the fuel injector manifold 700 of FIGS. 18A to 20. The same reference numerals or similar reference numerals will be used for components of the fuel injector manifold 800 that are the same as or similar to the components of the fuel injector manifold 700 discussed above. The description of these components above also applies to this embodiment, and a detailed description of these components and the function of these components are omitted here. The fuel injector manifold 800 includes a variable fuel flow system 820 that is different than the variable fuel flow system 720 of FIGS. 18A to 20. The variable fuel flow system 820 includes a plurality of pistons 822 and each of the plurality of pistons 822 includes one or more actuation mechanisms 824. The actuation mechanisms 824 are different than the actuation mechanisms 724. The actuation mechanisms 824 are wave springs, similar to the actuation mechanism 124 of FIGS. 3A to 6B. The variation described with respect to FIG. 21 may apply to any of the fuel injector manifolds described herein.

Figure 22:
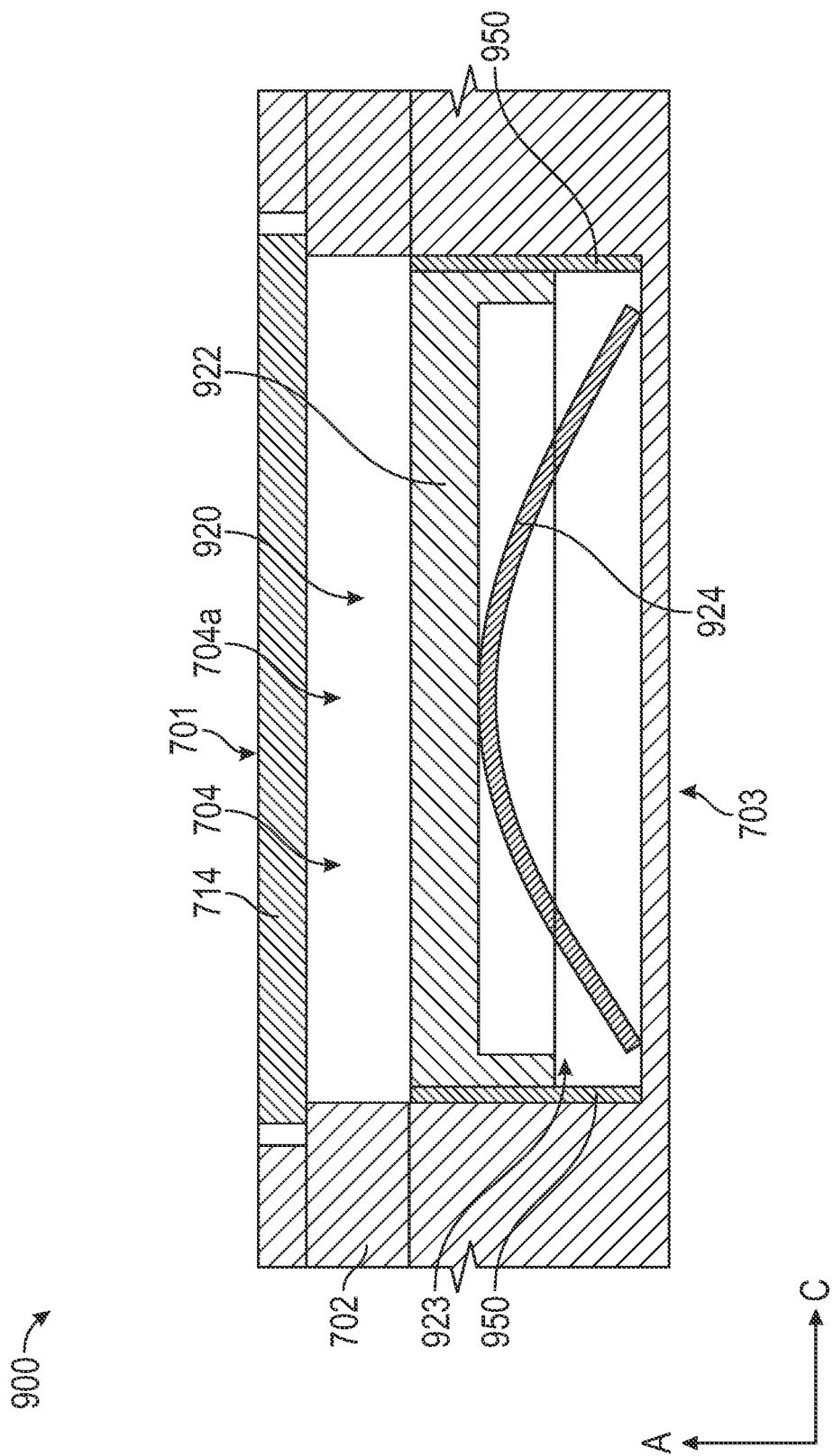
FIG. 22 is a schematic partial cross-sectional top view of a fuel injector manifold, taken along a longitudinal axis of the fuel injector manifold, according to another embodiment.

FIG. 22 is a schematic partial cross-sectional top view of a fuel injector manifold 900, taken along a longitudinal axis of the fuel injector manifold 900, according to another embodiment. The fuel injector manifold 900 is substantially similar to the fuel injector manifold 700 of FIGS. 18A to 20. The same reference numerals or similar reference numerals will be used for components of the fuel injector manifold 900 that are the same as or similar to the components of the fuel injector manifold 700 discussed above. The description of these components above also applies to this embodiment, and a detailed description of these components and the function of these components are omitted here. The fuel injector manifold 900 includes a variable fuel flow system 920 that is different than the variable fuel flow system 720 of FIGS. 18A to 20. The variable fuel flow system 920 includes a plurality of pistons 922 disposed within a plurality of piston cavities 923 and sealed by one or more seals 950. The plurality of pistons 922 includes one or more actuation mechanisms 924. The actuation mechanisms 924 are different than the actuation mechanisms 724. The actuation mechanisms 924 are leaf springs that compress and expand to actuate the respective piston 922. In some embodiments, the actuation mechanisms 924 include memory material (e.g., a temperature sensitive material) that compresses and expands by thermal energy (e.g., as a temperature of the actuation mechanisms 924 increases or decreases). The variation described with respect to FIG. 22 may apply to any of the fuel injector manifolds described herein.

Figure 23:
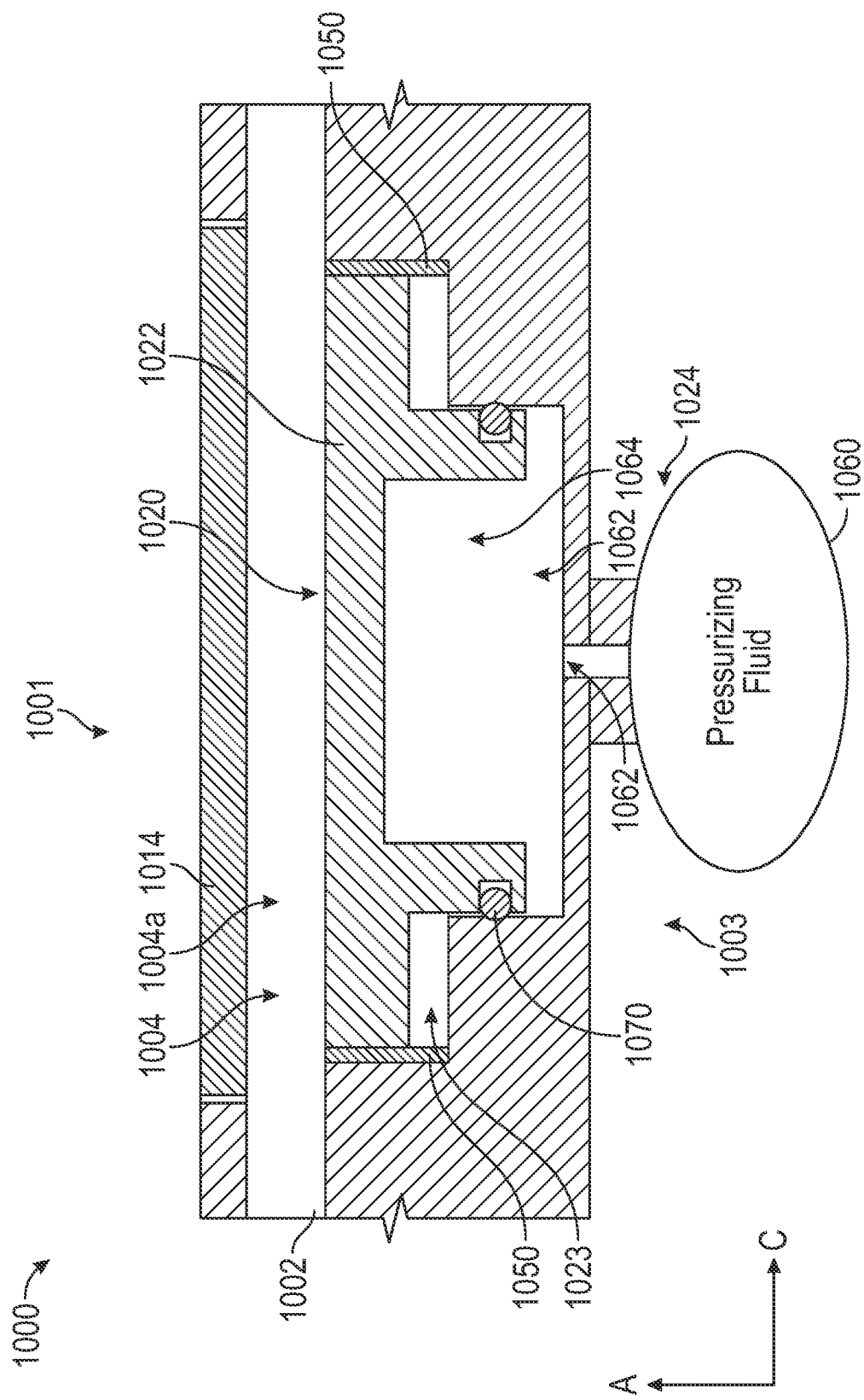
FIG. 23 is a schematic partial cross-sectional top view of a fuel injector manifold, taken along a longitudinal axis of the fuel injector manifold, according to another embodiment.

FIG. 23 is a schematic partial cross-sectional top view of a fuel injector manifold 1000, taken along a longitudinal axis of the fuel injector manifold 1000, according to another embodiment. The fuel injector manifold 1000 is substantially similar to the fuel injector manifold 700 of FIGS. 18A to 20 and includes many of the same or similar components of the fuel injector manifold 700 even though some components are not explicitly detailed with respect to the fuel injector manifold 1000. The same reference numerals or similar reference numerals will be used for components of the fuel injector manifold 1000 that are the same as or similar to the components of the fuel injector manifold 700 discussed above. The description of these components above also applies to this embodiment, and a detailed description of these components and the function of these components are omitted here. The fuel injector manifold 1000 extends between an aft end 1001 and a forward end 1003. The fuel injector manifold 1000 includes a fuel manifold ring 1002, a fuel manifold flowpath 1004 including an upstream fuel manifold flowpath 1004a, a plug 1014, and a variable fuel flow system 1020 that is different than the variable fuel flow system 720 of FIGS. 18A to 20. The variable fuel flow system 1020 includes a plurality of pistons 1022 disposed within a plurality of piston cavities 1023 and sealed by one or more seals 1050. The variation described with respect to FIG. 23 may apply to any of the fuel injector manifolds described herein.

The plurality of pistons 1022 includes one or more actuation mechanisms 1024 that are different than the actuation mechanisms 724. The actuation mechanisms 1024 include active actuation mechanisms. In particular, the actuation mechanisms 1024 are fluid actuation mechanisms (e.g., hydraulic actuation or pneumatic actuation). The actuation mechanisms 1024 include a pressurizing fluid (e.g., hydraulic fluid, air, or a gas) stored within a pressurizing fluid tank 1060. The actuation mechanisms 1024 include one or more fuel manifold actuation mechanism flowpaths 1062 and one or more piston actuation mechanism flowpaths 1064. The one or more fuel manifold actuation mechanism flowpaths 1062 extend through the fuel manifold ring 1002 and provide fluid communication from the pressurizing fluid tank 1060 to the one or more piston actuation mechanism flowpaths 1064. The piston actuation mechanism flowpaths 1064 extend through a respective piston 1022. An actuation mechanism seal 1070 is disposed about the fuel manifold actuation mechanism flowpaths 1062 to seal the fuel manifold actuation mechanism flowpaths 1062.

In operation, the actuation mechanisms 1024 are controlled (e.g., by a controller) to move the plurality of pistons 1022 from the closed state, to the partially opened state, and to the fully opened state. In particular, the controller controls the actuation mechanisms 1024 to supply the pressurizing fluid from the pressurizing fluid tank 1060 through the one or more fuel manifold actuation mechanism flowpaths 1062 and into the one or more piston actuation mechanism flowpaths 1064 to push the plurality of pistons 1022 to the closed state. As the fuel 67 flows through the fuel manifold flowpath 1004, the controller controls the actuation mechanisms 1024 to retract the pressurizing fluid from the one or more piston actuation mechanism flowpaths 1064 back to the pressurizing fluid tank 1060. The pressure difference between the fuel 67 in the upstream fuel manifold flowpath 1004a and in the one or more piston actuation mechanism flowpaths 1064 causes the plurality of pistons 1022 to move to the partially opened state. As the fuel 67 continues to flow through the fuel manifold flowpath 1004, the controller controls the actuation mechanisms 1024 to continue to retract the pressurizing fluid from the one or more piston actuation mechanism flowpaths 1064 to the pressurizing fluid tank 1060. The pressure difference between the fuel 67 in the upstream fuel manifold flowpath 1004a and the one or more piston actuation mechanism flowpaths 1064 causes the plurality of pistons 1022 to continue to move to the fully opened state. Thus, the actuation mechanisms 1024 are controlled to actively move the plurality of pistons 1022.

Figure 24:
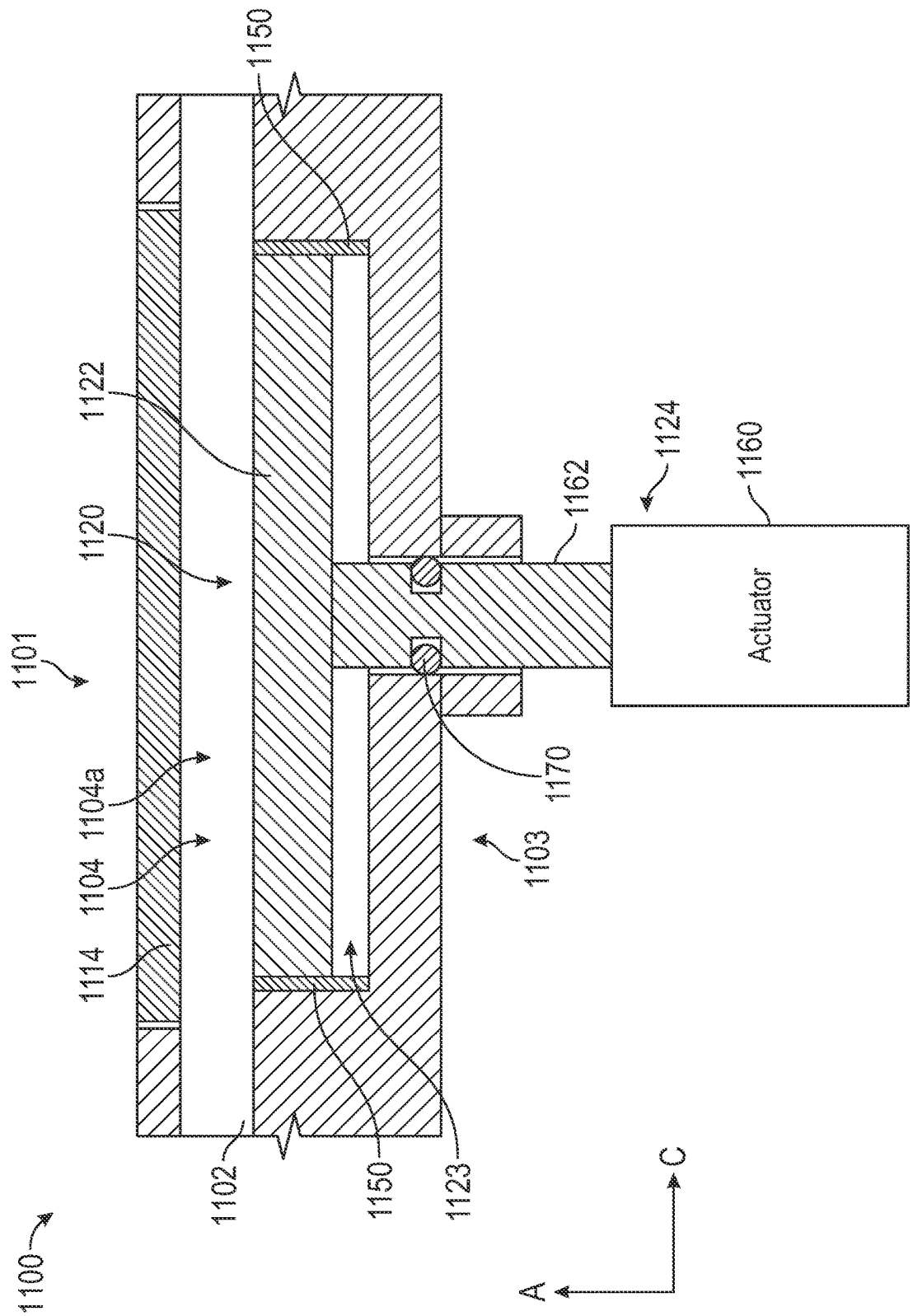
FIG. 24 is a schematic partial cross-sectional top view of a fuel injector manifold, taken along a longitudinal axis of the fuel injector manifold, according to another embodiment.

FIG. 24 is a schematic partial cross-sectional top view of a fuel injector manifold 1100, taken along a longitudinal axis of the fuel injector manifold 1100, according to another embodiment. The fuel injector manifold 1100 is substantially similar to the fuel injector manifold 700 of FIGS. 18A to 20 and includes many of the same or similar components of the fuel injector manifold 700 even though some components are not explicitly detailed with respect to the fuel injector manifold 1100. The same reference numerals or similar reference numerals will be used for components of the fuel injector manifold 1100 that are the same as or similar to the components of the fuel injector manifold 700 discussed above. The description of these components above also applies to this embodiment, and a detailed description of these components and the function of these components are omitted here. The fuel injector manifold 1100 extends between an aft end 1101 and a forward end 1103. The fuel injector manifold 1100 includes a fuel manifold ring 1102, a fuel manifold flowpath 1104 including an upstream fuel manifold flowpath 1104a, a plug 1114, and a variable fuel flow system 1120 that is different than the variable fuel flow system 720 of FIGS. 18A to 20. The variable fuel flow system 1120 includes a plurality of pistons 1122 disposed within a plurality of piston cavities 1123 and sealed by one or more seals 1150. The variation described with respect to FIG. 24 may apply to any of the fuel injector manifolds described herein.

The plurality of pistons 1122 includes one or more actuation mechanisms 1124 that are different than the actuation mechanisms 724. The actuation mechanisms 1124 include active actuation mechanisms. In particular, the actuation mechanisms 1124 are mechanical actuation mechanisms. The actuation mechanisms 1124 include an actuator 1160 having an actuator shaft 1162. The actuator 1160 can be any type of mechanical actuator, such as, for example, a solenoid actuator, a hydraulic cylinder, or the like, for providing linear actuation to the actuator shaft 1162. The actuator shaft 1162 is coupled to a respective piston 1122. The actuator shaft 1162 includes an actuator shaft seal 1170 that seals the piston cavities 1123 to prevent the fuel 67 from flowing out of the piston cavities 1123 about the actuator shaft 1162.

In operation, the actuation mechanisms 1124 are controlled (e.g., by a controller) to move the plurality of pistons 1122 from the closed state, to the partially opened state, and to the fully opened state. In particular, the controller controls the actuator 1160 to move the actuator shaft 1162 axially to push the plurality of pistons 1122 to the closed state. As the fuel 67 flows through the fuel manifold flowpath 1104, the controller controls the actuator 1160 to retract (e.g., pull) the actuator shaft 1162 and to move the pistons 1122 to the partially opened state. As the fuel 67 continues to flow through the fuel manifold flowpath 1104, the controller controls the actuator 1160 to continue to retract the actuator shaft 1162 and to continue to move the pistons 1122 to the fully opened state. Thus, the actuation mechanisms 1124 are controlled to actively move the plurality of pistons 1122.

Accordingly, the variable fuel flow systems herein adjust the delta pressure between the fuel manifold ring and the plurality of fuel injectors to ensure a high delta pressure for increasing the atomization of the fuel and the air, as compared to turbine engines without the benefit of the present disclosure. This increases the momentum of the fuel jet from the fuel injectors to improve the atomization and mixing of the fuel and the air, thereby making it easier for the fuel and air mixture to ignite and to combust, as compared to turbine engines without the benefit of the present disclosure. In this way, the variable fuel flow system provides for improved ignition capability, especially, for cold fuels (e.g., at higher altitudes) or high viscosity fuels by increasing the atomization of the fuel and the air. This leads to improved sub-idle efficiency and low power efficiency of the combustor due to the increased atomization, and lower smoke generation at high power operation, as compared to turbine engines without the benefit of the present disclosure.

Further aspects of the present disclosure are provided by the subject matter of the following clauses.

A fuel injector manifold for a turbine engine comprises a fuel manifold ring that defines a fuel manifold flowpath within the fuel manifold ring, the fuel manifold flowpath receiving fuel therein, a plurality of fuel injectors in fluid communication with the fuel manifold flowpath, each of the plurality of fuel injectors having one or more fuel injector flowpaths, and a variable fuel flow system disposed within the fuel manifold flowpath, the variable fuel flow system including a closed state, a partially opened state, and a fully opened state to vary a flow of the fuel from the fuel manifold flowpath to the one or more fuel injector flowpaths of each of the plurality of fuel injectors.

The fuel injector manifold of the preceding clause, wherein the one or more fuel injector flowpaths are disposed at a circumferential fuel injector flowpath angle with respect to a lateral centerline axis of the fuel injector manifold, the circumferential fuel injector flowpath angle being non-zero.

The fuel injector manifold of any preceding clause, wherein the one or more fuel injector flowpaths are disposed at an axial fuel injector flowpath angle with respect to a lateral centerline axis, the axial fuel injector flowpath angle being non-zero.

The fuel injector manifold of any preceding clause, wherein the plurality of fuel injectors is oriented to inject the fuel substantially radially from the one or more fuel injector flowpaths of each of the plurality of fuel injectors.

The fuel injector manifold of any preceding clause, wherein the variable fuel flow system includes one or more pistons disposed within the fuel manifold flowpath, the one or more pistons moving between the closed state, the partially opened state, and the fully opened state to vary the flow of the fuel to the one or more fuel injector flowpaths of each of the plurality of fuel injectors.

The fuel injector manifold of any preceding clause, wherein each of the one or more pistons includes one or more piston flowpaths in fluid communication with the fuel manifold flowpath and the one or more fuel injector flowpaths of each of the plurality of fuel injectors, the one or more piston flowpaths directing the fuel from the fuel manifold flowpath to the one or more fuel injector flowpaths of each of the plurality of fuel injectors.

The fuel injector manifold of any preceding clause, wherein the one or more pistons split the fuel manifold flowpath into an upstream fuel manifold flowpath and a downstream fuel manifold flowpath, and the fuel flows from the upstream fuel manifold flowpath into the downstream fuel manifold flowpath, and through the one or more piston flowpaths into the one or more fuel injector flowpaths of each of the plurality of fuel injectors.

The fuel injector manifold of any preceding clause, wherein the variable fuel flow system includes one or more actuation mechanisms coupled to the one or more pistons, the one or more actuation mechanisms moving the one or more pistons.

The fuel injector manifold of any preceding clause, wherein the one or more actuation mechanisms are passive actuation mechanisms.

The fuel injector manifold of any preceding clause, wherein the one or more actuation mechanisms are active actuation mechanisms.

The fuel injector manifold of any preceding clause, wherein the turbine engine defines an axial direction, a radial direction, and a circumferential direction.

The fuel injector manifold of any preceding clause, further including a fuel manifold inlet having a fuel manifold inlet flowpath in fluid communication with the fuel manifold flowpath, the fuel manifold inlet flowpath supplying the fuel to the fuel manifold flowpath.

The fuel injector manifold of any preceding clause, wherein the turbine engine includes a fuel system in fluid communication with the fuel manifold inlet flowpath, and the fuel system supplies the fuel from the fuel system to the fuel manifold flowpath through the fuel manifold inlet flowpath.

The fuel injector manifold of any preceding clause, wherein the plurality of fuel injectors is spaced circumferentially about the fuel manifold ring.

The fuel injector manifold of any preceding clause, further comprising a fuel manifold heat shield that covers at least a portion of the fuel manifold ring.

The fuel injector manifold of any preceding clause, wherein the one or more piston flowpaths include one or more first piston flowpaths, one or more second piston flowpaths, and one or more third piston flowpaths.

The fuel injector manifold of any preceding clause, wherein the one or more first piston flowpaths are in fluid communication with the upstream fuel manifold flowpath and the downstream fuel manifold flowpath, the one or more first piston flowpaths directing the fuel from the upstream fuel manifold flowpath to the downstream fuel manifold flowpath.

The fuel injector manifold of any preceding clause, wherein the one or more second piston flowpaths are in fluid communication with the downstream fuel manifold flowpath and the one or more third piston flowpaths, the one or more second piston flowpaths directing the fuel from the downstream fuel manifold flowpath to the one or more third piston flowpaths.

The fuel injector manifold of any preceding clause, wherein the one or more third piston flowpaths are in fluid communication with the one or more second piston flowpaths and the one or more fuel injector flowpaths, the one or more third piston flowpaths directing the fuel from the one or more second piston flowpaths to the one or more fuel injector flowpaths.

The fuel injector manifold of any preceding clause, wherein the one or more third piston flowpaths are misaligned with the one or more fuel injector flowpaths when the variable fuel flow system is in the closed state.

The fuel injector manifold of any preceding clause, wherein the one or more third piston flowpaths are partially aligned with the one or more fuel injector flowpaths when the variable fuel flow system is in the partially opened state.

The fuel injector manifold of any preceding clause, wherein the one or more third piston flowpaths are fully aligned with the one or more fuel injector flowpaths when the variable fuel flow system is in the fully opened state.

The fuel injector manifold of any preceding clause, wherein the one or more pistons include one piston that is annular about the fuel manifold ring within the fuel manifold flowpath.

The fuel injector manifold of any preceding clause, wherein the upstream fuel manifold flowpath is upstream of the one or more pistons.

The fuel injector manifold of any preceding clause, wherein the downstream fuel manifold flowpath is downstream of the one or more pistons.

The fuel injector manifold of any preceding clause, wherein the one or more fuel injector flowpaths of each of the plurality of fuel injectors include a single fuel injector flowpath.

The fuel injector manifold of any preceding clause, wherein the one or more fuel injector flowpaths are circular.

The fuel injector manifold of any preceding clause, wherein the one or more pistons move axially forward and axially aftward within the fuel manifold flowpath.

The fuel injector manifold of any preceding clause, wherein the circumferential fuel injector flowpath angle is in a range of negative sixty degrees to sixty degrees.

The fuel injector manifold of any preceding clause, wherein the axial fuel injector flowpath angle is in a range of negative sixty degrees to sixty degrees.

The fuel injector manifold of any preceding clause, wherein the one or more fuel injector flowpaths of each of the plurality of fuel injectors include a first fuel injector flowpath and a second fuel injector flowpath.

The fuel injector manifold of any preceding clause, wherein the first fuel injector flowpath includes a first fuel injector flowpath diameter, and the second fuel injector flowpath includes a second fuel injector flowpath diameter.

The fuel injector manifold of any preceding clause, wherein the first fuel injector flowpath diameter is equal to the second fuel injector flowpath diameter.

The fuel injector manifold of any preceding clause, wherein the first fuel injector flowpath diameter is greater than or less than the second fuel injector flowpath diameter.

The fuel injector manifold of any preceding clause, wherein the first fuel injector flowpath and the second fuel injector flowpath are angled toward each other in the circumferential direction such that the fuel through the first fuel injector flowpath impinges on the fuel from the second fuel injector flowpath to atomize the fuel.

The fuel injector manifold of any preceding clause, wherein the first fuel injector flowpath is disposed at a first circumferential fuel injector angle with respect to the lateral centerline axis in the circumferential direction.

The fuel injector manifold of any preceding clause, wherein the second fuel injector flowpath is disposed at a second circumferential fuel injector angle with respect to the lateral centerline axis in the circumferential direction.

The fuel injector manifold of any preceding clause, wherein the first circumferential fuel injector flowpath angle and the second circumferential fuel injector flowpath angle are non-zero.

The fuel injector manifold of any preceding clause, wherein each of the first circumferential fuel injector flowpath angle and the second circumferential fuel injector flowpath angle is in a range of ten degrees to sixty degrees.

The fuel injector manifold of any preceding clause, wherein the second circumferential fuel injector flowpath angle is opposite the first circumferential fuel injector flowpath angle such that the first circumferential fuel injector flowpath and the second circumferential fuel injector flowpath are angled toward each other in the circumferential direction.

The fuel injector manifold of any preceding clause, wherein the first fuel injector flowpath is spaced from the second fuel injector flowpath in the circumferential direction such that a first lateral centerline axis of the first fuel injector flowpath and a second lateral centerline axis of the second fuel injector flowpath are offset by a fuel injector flowpath circumferential distance.

The fuel injector manifold of any preceding clause, wherein the first fuel injector flowpath and the second fuel injector flowpath are disposed at an axial fuel injector flowpath angle with respect to the axial direction, the axial fuel injector flowpath angle being non-zero.

The fuel injector manifold of any preceding clause, wherein the one or more fuel injector flowpaths are oval shaped.

The fuel injector manifold of any preceding clause, wherein the one or more fuel injector flowpaths are slits.

The fuel injector manifold of any preceding clause, further comprising a pressure atomizer disposed within an atomizer cavity that is radially between the one or more pistons and the one or more fuel injector flowpaths, the pressure atomizer atomizing the fuel as the fuel flows from the one or more piston flowpaths to the one or more fuel injector flowpaths.

The fuel injector manifold of any preceding clause, wherein the one or more fuel injector flowpaths are converging-diverging flowpaths.

The fuel injector manifold of any preceding clause, wherein the one or more fuel injector flowpaths are converging and diverging from a radially outer end to a radially inner end of the plurality of fuel injectors.

The fuel injector manifold of any preceding clause, wherein the pressure atomizer includes a plurality of atomizer flowpaths in fluid communication with the one or more piston flowpaths and the one or more fuel injector flowpaths, the plurality of atomizer flowpaths directing the fuel from the one or more piston flowpaths to the one or more fuel injector flowpaths to atomizer the fuel.

The fuel injector manifold of any preceding clause, wherein the plurality of atomizer flowpaths includes a first atomizer flowpath and a second atomizer flowpath.

The fuel injector manifold of the preceding clause, wherein the first atomizer flowpath is circumferentially spaced from the second atomizer flowpath.

The fuel injector manifold of any preceding clause, wherein the first atomizer flowpath is axially aligned with the second atomizer flowpath at a radially outer end of the pressure atomizer.

The fuel injector manifold of any preceding clause, wherein the first atomizer flowpath and the second atomizer flowpath are angled away from each other in the axial direction.

The fuel injector manifold of any preceding clause, wherein the first atomizer flowpath is angled axially aftward as the first atomizer flowpath extends from the radially outer end to a radially inner end of the pressure atomizer.

The fuel injector manifold of any preceding clause, wherein the second atomizer flowpath is angled axially forward as the second atomizer flowpath extends from the radially outer end to the radially inner end of the pressure atomizer.

The fuel injector manifold of any preceding clause, further comprising an atomizer plug disposed within the atomizer cavity and contacting the pressure atomizer to prevent the pressure atomizer from rotating.

The fuel injector manifold of any preceding clause, wherein the one or more pistons include a plurality of pistons that is spaced circumferentially about the fuel manifold ring.

The fuel injector manifold of any preceding clause, wherein a respective one of the plurality of pistons is positioned within the fuel manifold ring at a respective one of the plurality of fuel injectors.

The fuel injector manifold of any preceding clause, wherein the plurality of pistons is disposed within a plurality of piston cavities defined through the fuel manifold ring.

The fuel injector manifold of any preceding clause, wherein the one or more actuation mechanisms include a single actuation mechanism that is annular about the fuel manifold ring and coupled to each of the plurality of pistons.

The fuel injector manifold of any preceding clause, wherein the one or more actuation mechanisms include a plurality of actuation mechanisms, and a respective one of the plurality of actuation mechanisms is coupled to a respective one of the plurality of pistons.

The fuel injector manifold of any preceding clause, wherein each of the plurality of actuation mechanisms moves the plurality of pistons at a different rate to vary the fuel delivery circumferentially about the fuel manifold ring.

The fuel injector manifold of any preceding clause, wherein the one or more piston flowpaths are annular about the one or more pistons.

The fuel injector manifold of any preceding clause, further comprising one or more seals that seal the plurality of piston cavities to prevent the fuel from flowing into the piston cavities.

The fuel injector manifold of any preceding clause, wherein the one or more actuation mechanisms are wave springs.

The fuel injector manifold of any preceding clause, wherein the one or more actuation mechanisms are compression springs or tension springs.

The fuel injector manifold of any preceding clause, wherein the one or more actuation mechanisms are leaf springs.

The fuel injector manifold of any preceding clause, wherein the one or more actuation mechanisms include a memory material that expands and retracts by thermal energy.

The fuel injector manifold of any preceding clause, wherein the one or more actuation mechanisms are fluid actuation mechanisms that supply a flow of pressurizing fluid to move the one or more pistons.

The fuel injector manifold of any preceding clause, wherein the fluid actuation mechanisms include hydraulic actuation and the pressurizing fluid is hydraulic fluid.

The fuel injector manifold of any preceding clause, wherein the fluid actuation mechanisms include pneumatic actuation and the pressurizing fluid is air or a gas.

The fuel injector manifold of any preceding clause, wherein the fluid actuation mechanisms include a pressurizing fluid tank that stores the pressurizing fluid therein, one or more fuel manifold actuation mechanism flowpaths, and one or more piston actuation mechanism flowpaths.

The fuel injector manifold of any preceding clause, wherein the fluid actuation mechanisms supply the pressurizing fluid from the pressurizing tank to the one or more piston actuation mechanism flowpaths through the one or more fuel manifold actuation mechanism flowpaths to push the one or more pistons towards the closed state.

The fuel injector manifold of any preceding clause, wherein the fluid actuation mechanisms retract the pressurizing fluid from one or more piston actuation mechanism flowpaths to the pressurizing tank to pull the one or more pistons towards the fully opened state.

The fuel injector manifold of any preceding clause, wherein the one or more actuation mechanisms are mechanical actuation mechanisms.

The fuel injector manifold of any preceding clause, wherein the one or more actuation mechanisms include an actuator having an actuator shaft coupled to the one or more pistons, and the actuator pushes and pulls the actuator shaft to move the one or more pistons between the closed state, the partially opened state, and the fully opened state.

A turbine engine comprises a combustor and a fuel injector manifold. The fuel injector manifold comprises a fuel manifold ring disposed about the combustor, the fuel manifold ring defining a fuel manifold flowpath within the fuel manifold ring, and the fuel manifold flowpath receiving fuel therein, a plurality of fuel injectors in fluid communication with the fuel manifold flowpath and the combustor, each of the plurality of fuel injectors having one or more fuel injector flowpaths, and a variable fuel flow system disposed within the fuel manifold flowpath, the variable fuel flow system including a closed state, a partially opened state, and a fully opened state to vary a flow of the fuel from the fuel manifold flowpath to the one or more fuel injector flowpaths of each of the plurality of fuel injectors for injecting the fuel into the combustor.

The turbine engine of the preceding clause, wherein the one or more fuel injector flowpaths are disposed at a circumferential fuel injector flowpath angle with respect to a lateral centerline axis of the fuel injector manifold, the circumferential fuel injector flowpath angle being non-zero.

The turbine engine of any preceding clause, wherein the one or more fuel injector flowpaths are disposed at an axial fuel injector flowpath angle with respect to a lateral centerline axis, the axial fuel injector flowpath angle being non-zero.

The turbine engine of any preceding clause, wherein the plurality of fuel injectors is oriented to inject the fuel substantially radially from the one or more fuel injector flowpaths of each of the plurality of fuel injectors.

The turbine engine of any preceding clause, wherein the variable fuel flow system includes one or more pistons disposed within the fuel manifold flowpath, the one or more pistons moving between the closed state, the partially opened state, and the fully opened state to vary the flow of the fuel to the one or more fuel injector flowpaths of each of the plurality of fuel injectors.

The turbine engine of any preceding clause, wherein each of the one or more pistons includes one or more piston flowpaths in fluid communication with the fuel manifold flowpath and the one or more fuel injector flowpaths of each of the plurality of fuel injectors, the one or more piston flowpaths directing the fuel from the fuel manifold flowpath to the one or more fuel injector flowpaths of each of the plurality of fuel injectors.

The turbine engine of any preceding clause, wherein the one or more pistons split the fuel manifold flowpath into an upstream fuel manifold flowpath and a downstream fuel manifold flowpath, and the fuel flows from the upstream fuel manifold flowpath into the downstream fuel manifold flowpath, and through the one or more piston flowpaths into the one or more fuel injector flowpaths of each of the plurality of fuel injectors.

The turbine engine of any preceding clause, wherein the variable fuel flow system includes one or more actuation mechanisms coupled to the one or more pistons, the one or more actuation mechanisms moving the one or more pistons.

The turbine engine of any preceding clause, wherein the one or more actuation mechanisms are passive actuation mechanisms.

The turbine engine of any preceding clause, wherein the one or more actuation mechanisms are active actuation mechanisms.

The turbine engine of any preceding clause, further comprising a fuel system in fluid communication with the fuel manifold inlet flowpath, and the fuel system supplies the fuel from the fuel system to the fuel manifold flowpath through the fuel manifold inlet flowpath.

The turbine engine of any preceding clause, wherein the fuel injector manifold is the fuel injector manifold of any preceding clause.

A method of operating the fuel injector manifold of any preceding clause, the method comprising supplying fuel through the fuel manifold flowpath, moving the variable fuel flow system between the closed state, the partially opened state, and the fully opened state to vary the flow of the fuel from the fuel manifold flowpath to the one or more fuel injector flowpaths of each of the plurality of fuel injectors.

The method of the preceding clause, further comprising directing the fuel through the one or more fuel injector flowpaths at a circumferential fuel injector flowpath angle with respect to a lateral centerline axis of the fuel injector manifold, the circumferential fuel injector flowpath angle being non-zero.

The method of any preceding clause, further comprising directing the fuel through the one or more fuel injector flowpaths at an axial fuel injector flowpath angle with respect to a lateral centerline axis, the axial fuel injector flowpath angle being non-zero.

The method of any preceding clause, further comprising injecting the fuel substantially radially from the one or more fuel injector flowpaths of each of the plurality of fuel injectors.

The method of any preceding clause, wherein the variable fuel flow system includes one or more pistons disposed within the fuel manifold flowpath, and the method further comprises moving the one or more pistons among the closed state, the partially opened state, and the fully opened state to vary the flow of the fuel to the one or more fuel injector flowpaths of each of the plurality of fuel injectors.

The method of any preceding clause, wherein each of the one or more pistons includes one or more piston flowpaths in fluid communication with the fuel manifold flowpath and the one or more fuel injector flowpaths of each of the plurality of fuel injectors, and the method further comprises directing the fuel through the one or more piston flowpaths from the fuel manifold flowpath to the one or more fuel injector flowpaths of each of the plurality of fuel injectors.

The method of any preceding clause, wherein the one or more pistons split the fuel manifold flowpath into an upstream fuel manifold flowpath and a downstream fuel manifold flowpath, and the method further comprises directing the fuel from the upstream fuel manifold flowpath into the downstream fuel manifold flowpath, and through the one or more piston flowpaths into the one or more fuel injector flowpaths of each of the plurality of fuel injectors.

The method of any preceding clause, wherein the variable fuel flow system includes one or more actuation mechanisms coupled to the one or more pistons, and the method further comprises moving the one or more pistons with the one or more actuation mechanisms.

The method of any preceding clause, wherein the one or more actuation mechanisms are passive actuation mechanisms.

The method of any preceding clause, wherein the one or more actuation mechanisms are active actuation mechanisms.

The method of any preceding clause, wherein the turbine engine defines an axial direction, a radial direction, and a circumferential direction.

The method of any preceding clause, further including a fuel manifold inlet having a fuel manifold inlet flowpath in fluid communication with the fuel manifold flowpath, and the method further comprising supplying the fuel from the fuel manifold inlet flowpath to the fuel manifold flowpath.

The method of any preceding clause, wherein the turbine engine includes a fuel system in fluid communication with the fuel manifold inlet flowpath, and the method further comprises supplying the fuel from the fuel system to the fuel manifold flowpath through the fuel manifold inlet flowpath.

The method of any preceding clause, wherein the plurality of fuel injectors is spaced circumferentially about the fuel manifold ring.

The method of any preceding clause, further comprising a fuel manifold heat shield that covers at least a portion of the fuel manifold ring.

The method of any preceding clause, wherein the one or more piston flowpaths include one or more first piston flowpaths, one or more second piston flowpaths, and one or more third piston flowpaths.

The method of any preceding clause, wherein the one or more first piston flowpaths are in fluid communication with the upstream fuel manifold flowpath and the downstream fuel manifold flowpath, and the method further comprises directing the fuel through the one or more first piston flowpaths from the upstream fuel manifold flowpath to the downstream fuel manifold flowpath.

The method of any preceding clause, wherein the one or more second piston flowpaths are in fluid communication with the downstream fuel manifold flowpath and the one or more third piston flowpaths, and the method further comprises directing the fuel through the one or more second piston flowpaths from the downstream fuel manifold flowpath to the one or more third piston flowpaths.

The method of any preceding clause, wherein the one or more third piston flowpaths are in fluid communication with the one or more second piston flowpaths and the one or more fuel injector flowpaths, and the method further comprises directing the fuel through the one or more third piston flowpaths from the one or more second piston flowpaths to the one or more fuel injector flowpaths.

The method of any preceding clause, wherein the one or more third piston flowpaths are misaligned with the one or more fuel injector flowpaths when the variable fuel flow system is in the closed state.

The method of any preceding clause, wherein the one or more third piston flowpaths are partially aligned with the one or more fuel injector flowpaths when the variable fuel flow system is in the partially opened state.

The method of any preceding clause, wherein the one or more third piston flowpaths are fully aligned with the one or more fuel injector flowpaths when the variable fuel flow system is in the fully opened state.

The method of any preceding clause, wherein the one or more pistons include one piston that is annular about the fuel manifold ring within the fuel manifold flowpath.

The method of any preceding clause, wherein the upstream fuel manifold flowpath is upstream of the one or more pistons.

The method of any preceding clause, wherein the downstream fuel manifold flowpath is downstream of the one or more pistons.

The method of any preceding clause, wherein the one or more fuel injector flowpaths of each of the plurality of fuel injectors include a single fuel injector flowpath.

The method of any preceding clause, wherein the one or more fuel injector flowpaths are circular.

The method of any preceding clause, wherein the one or more pistons move axially forward and axially aftward within the fuel manifold flowpath.

The method of any preceding clause, wherein the circumferential fuel injector flowpath angle is in a range of negative sixty degrees to sixty degrees.

The method of any preceding clause, wherein the axial fuel injector flowpath angle is in a range of negative sixty degrees to sixty degrees.

The method of any preceding clause, wherein the one or more fuel injector flowpaths of each of the plurality of fuel injectors include a first fuel injector flowpath and a second fuel injector flowpath.

The method of any preceding clause, wherein the first fuel injector flowpath includes a first fuel injector flowpath diameter, and the second fuel injector flowpath includes a second fuel injector flowpath diameter.

The method of any preceding clause, wherein the first fuel injector flowpath diameter is equal to the second fuel injector flowpath diameter.

The method of any preceding clause, wherein the first fuel injector flowpath diameter is greater than or less than the second fuel injector flowpath diameter.

The method of any preceding clause, further comprising directing the fuel through the first fuel injector flowpath and the second fuel injector flowpath at an angle toward each other in the circumferential direction such that the fuel through the first fuel injector flowpath impinges on the fuel from the second fuel injector flowpath to atomize the fuel.

The method of any preceding clause, further comprising directing the fuel through the first fuel injector flowpath at a first circumferential fuel injector angle with respect to the lateral centerline axis in the circumferential direction.

The method of any preceding clause, further comprising directing the fuel through the second fuel injector flowpath at a second circumferential fuel injector angle with respect to the lateral centerline axis in the circumferential direction.

The fuel injector manifold of any preceding clause, wherein the first circumferential fuel injector flowpath angle and the second circumferential fuel injector flowpath angle are non-zero.

The method of any preceding clause, wherein each of the first circumferential fuel injector flowpath angle and the second circumferential fuel injector flowpath angle is in a range of ten degrees to sixty degrees.

The method of any preceding clause, wherein the second circumferential fuel injector flowpath angle is opposite the first circumferential fuel injector flowpath angle such that the first circumferential fuel injector flowpath and the second circumferential fuel injector flowpath are angled toward each other in the circumferential direction.

The method of any preceding clause, wherein the first fuel injector flowpath is spaced from the second fuel injector flowpath in the circumferential direction such that a first lateral centerline axis of the first fuel injector flowpath and a second lateral centerline axis of the second fuel injector flowpath are offset by a fuel injector flowpath circumferential distance.

The method of any preceding clause, further comprising directing the fuel through the first fuel injector flowpath and the second fuel injector flowpath at an axial fuel injector flowpath angle with respect to the axial direction, the axial fuel injector flowpath angle being non-zero.

The method of any preceding clause, wherein the one or more fuel injector flowpaths are oval shaped.

The method of any preceding clause, wherein the one or more fuel injector flowpaths are slits.

The method of any preceding clause, further comprising a pressure atomizer disposed within an atomizer cavity that is radially between the one or more pistons and the one or more fuel injector flowpaths, and the method further comprising atomizing, with the pressure atomizer, the fuel as the fuel flows from the one or more piston flowpaths to the one or more fuel injector flowpaths.

The method of any preceding clause, wherein the one or more fuel injector flowpaths are converging-diverging flowpaths.

The method of any preceding clause, wherein the one or more fuel injector flowpaths are converging and diverging from a radially outer end to a radially inner end of the plurality of fuel injectors.

The method of any preceding clause, wherein the pressure atomizer includes a plurality of atomizer flowpaths in fluid communication with the one or more piston flowpaths and the one or more fuel injector flowpaths, and the method further comprises directing the fuel through the plurality of atomizer flowpaths from the one or more piston flowpaths to the one or more fuel injector flowpaths to atomizer the fuel.

The method of any preceding clause, wherein the plurality of atomizer flowpaths includes a first atomizer flowpath and a second atomizer flowpath.

The method of any preceding clause, wherein the first atomizer flowpath is circumferentially spaced from the second atomizer flowpath.

The method of any preceding clause, wherein the first atomizer flowpath is axially aligned with the second atomizer flowpath at a radially outer end of the pressure atomizer.

The method of any preceding clause, wherein the first atomizer flowpath and the second atomizer flowpath are angled away from each other in the axial direction.

The method of any preceding clause, further comprising directing the fuel through the first atomizer flowpath at an angle axially aftward as the first atomizer flowpath extends from the radially outer end to a radially inner end of the pressure atomizer.

The method of any preceding clause, further comprising directing the fuel through the second atomizer flowpath at an angle axially forward as the second atomizer flowpath extends from the radially outer end to the radially inner end of the pressure atomizer.

The method of any preceding clause, further comprising preventing the pressure atomizer from rotating with an atomizer plug disposed within the atomizer cavity and contacting the pressure atomizer.

The method of any preceding clause, wherein the one or more pistons include a plurality of pistons that is spaced circumferentially about the fuel manifold ring.

The method of any preceding clause, wherein a respective one of the plurality of pistons is positioned within the fuel manifold ring at a respective one of the plurality of fuel injectors.

The method of any preceding clause, wherein the plurality of pistons is disposed within a plurality of piston cavities defined through the fuel manifold ring.

The method of any preceding clause, wherein the one or more actuation mechanisms include a single actuation mechanism that is annular about the fuel manifold ring and coupled to each of the plurality of pistons.

The method of any preceding clause, wherein the one or more actuation mechanisms include a plurality of actuation mechanisms, and a respective one of the plurality of actuation mechanisms is coupled to a respective one of the plurality of pistons.

The method of any preceding clause, further comprising moving, with each of the plurality of actuation mechanisms, the plurality of pistons at a different rate to vary the fuel delivery circumferentially about the fuel manifold ring.

The method of any preceding clause, wherein the one or more piston flowpaths are annular about the one or more pistons.

The method of any preceding clause, further comprising preventing the fuel from flowing into the plurality of piston cavities with one or more seals that seal the plurality of piston cavities.

The method of any preceding clause, wherein the one or more actuation mechanisms are wave springs.

The method of any preceding clause, wherein the one or more actuation mechanisms are compression springs or tension springs.

The method of any preceding clause, wherein the one or more actuation mechanisms are leaf springs.

The method of any preceding clause, wherein the one or more actuation mechanisms include a memory material that expands and retracts by thermal energy.

The method of any preceding clause, wherein the one or more actuation mechanisms are fluid actuation mechanisms, and the method further comprises supplying a flow of pressurizing fluid to move the one or more pistons.

The method of any preceding clause, wherein the fluid actuation mechanisms include hydraulic actuation and the pressurizing fluid is hydraulic fluid.

The method of any preceding clause, wherein the fluid actuation mechanisms include pneumatic actuation and the pressurizing fluid is air or a gas.

The method of any preceding clause, wherein the fluid actuation mechanisms include a pressurizing fluid tank that stores the pressurizing fluid therein, one or more fuel manifold actuation mechanism flowpaths, and one or more piston actuation mechanism flowpaths.

The method of any preceding clause, further comprising supplying, with the fluid actuation mechanisms, the pressurizing fluid from the pressurizing tank to the one or more piston actuation mechanism flowpaths through the one or more fuel manifold actuation mechanism flowpaths to push the one or more pistons towards the closed state.

The method of any preceding clause, further comprising retracting, with the fluid actuation mechanisms, the pressurizing fluid from one or more piston actuation mechanism flowpaths to the pressurizing tank to pull the one or more pistons towards the fully opened state.

The method of any preceding clause, wherein the one or more actuation mechanisms are mechanical actuation mechanisms.

The method of any preceding clause, wherein the one or more actuation mechanisms include an actuator having an actuator shaft coupled to the one or more pistons, and the method further comprises pushing and pulling, with the actuator, the actuator shaft to move the one or more pistons among the closed state, the partially opened state, and the fully opened state.

Although the foregoing description is directed to the preferred embodiments of the present disclosure, other variations and modifications will be apparent to those skilled in the art and may be made without departing from the disclosure. Moreover, features described in connection with one embodiment of the present disclosure may be used in conjunction with other embodiments, even if not explicitly stated above.

The invention claimed is:

1. A fuel injector manifold for a turbine engine, the fuel injector manifold comprising:
 a fuel manifold ring that defines a fuel manifold flowpath within the fuel manifold ring, the fuel manifold flowpath being annular about the fuel manifold ring and receiving fuel therein;

a plurality of fuel injectors in fluid communication with the fuel manifold flowpath, each of the plurality of fuel injectors having one or more fuel injector flowpaths; and a variable fuel flow system disposed within the fuel manifold flowpath, the variable fuel flow system including one or more pistons disposed within the fuel manifold flowpath and moving substantially perpendicularly to the fuel manifold flowpath between a closed state, a partially opened state, and a fully opened state to vary a flow of the fuel from the fuel manifold flowpath to the one or more fuel injector flowpaths of each of the plurality of fuel injectors.

2. The fuel injector manifold of claim 1, wherein the one or more fuel injector flowpaths are disposed at a circumferential fuel injector flowpath angle with respect to a lateral centerline axis of the fuel injector manifold, the circumferential fuel injector flowpath angle being non-zero.

3. The fuel injector manifold of claim 1, wherein the one or more fuel injector flowpaths are disposed at an axial fuel injector flowpath angle with respect to a lateral centerline axis of the fuel injector manifold, the axial fuel injector flowpath angle being non-zero.

4. The fuel injector manifold of claim 1, wherein the plurality of fuel injectors is oriented to inject the fuel substantially radially from the one or more fuel injector flowpaths of each of the plurality of fuel injectors.

5. The fuel injector manifold of claim 1, wherein each of the one or more pistons includes one or more piston flowpaths in fluid communication with the fuel manifold flowpath and the one or more fuel injector flowpaths of each of the plurality of fuel injectors, the one or more piston flowpaths directing the fuel from the fuel manifold flowpath to the one or more fuel injector flowpaths of each of the plurality of fuel injectors.

6. The fuel injector manifold of claim 5, wherein the one or more pistons split the fuel manifold flowpath into an upstream fuel manifold flowpath and a downstream fuel manifold flowpath, and the fuel flows from the upstream fuel manifold flowpath into the downstream fuel manifold flowpath, and through the one or more piston flowpaths into the one or more fuel injector flowpaths of each of the plurality of fuel injectors.

7. The fuel injector manifold of claim 1, wherein the variable fuel flow system includes one or more actuation mechanisms coupled to the one or more pistons, the one or more actuation mechanisms moving the one or more pistons.

8. The fuel injector manifold of claim 7, wherein the one or more actuation mechanisms are passive actuation mechanisms.

9. The fuel injector manifold of claim 7, wherein the one or more actuation mechanisms are active actuation mechanisms.

10. A turbine engine comprising:
a combustor; and
a fuel injector manifold comprising:
a fuel manifold ring disposed about the combustor, the fuel manifold ring defining a fuel manifold flowpath within the fuel manifold ring, and the fuel manifold flowpath being annular about the fuel manifold ring and receiving fuel therein;
a plurality of fuel injectors in fluid communication with the fuel manifold flowpath and the combustor, each of the plurality of fuel injectors having one or more fuel injector flowpaths; and
a variable fuel flow system disposed within the fuel manifold flowpath, the variable fuel flow system including one or more pistons disposed within the fuel manifold flowpath and moving substantially perpendicularly to the fuel manifold flowpath between a closed state, a partially opened state, and a fully opened state to vary a flow of the fuel from the fuel manifold flowpath to the one or more fuel injector flowpaths of each of the plurality of fuel injectors for injecting the fuel into the combustor.

11. The turbine engine of claim 10, wherein the one or more fuel injector flowpaths are disposed at a circumferential fuel injector flowpath angle with respect to a lateral centerline axis of the fuel injector manifold, the circumferential fuel injector flowpath angle being non-zero.

12. The turbine engine of claim 10, wherein the one or more fuel injector flowpaths are disposed at an axial fuel injector flowpath angle with respect to a lateral centerline axis of the fuel injector manifold, the axial fuel injector flowpath angle being non-zero.

13. The turbine engine of claim 10, wherein the plurality of fuel injectors is oriented to inject the fuel substantially radially from the one or more fuel injector flowpaths of each of the plurality of fuel injectors.

14. The turbine engine of claim 10, wherein each of the one or more pistons includes one or more piston flowpaths in fluid communication with the fuel manifold flowpath and the one or more fuel injector flowpaths of each of the plurality of fuel injectors, the one or more piston flowpaths directing the fuel from the fuel manifold flowpath to the one or more fuel injector flowpaths of each of the plurality of fuel injectors.

15. The turbine engine of claim 14, wherein the one or more pistons split the fuel manifold flowpath into an upstream fuel manifold flowpath and a downstream fuel manifold flowpath, and the fuel flows from the upstream fuel manifold flowpath into the downstream fuel manifold flowpath, and through the one or more piston flowpaths into the one or more fuel injector flowpaths of each of the plurality of fuel injectors.

16. The turbine engine of claim 10, wherein the variable fuel flow system includes one or more actuation mechanisms coupled to the one or more pistons, the one or more actuation mechanisms moving the one or more pistons.

17. The turbine engine of claim 16, wherein the one or more actuation mechanisms are passive actuation mechanisms.

18. The turbine engine of claim 16, wherein the one or more actuation mechanisms are active actuation mechanisms.

19. The turbine engine of claim 10, wherein the fuel manifold flowpath extends circumferentially about the fuel manifold ring, and the one or more pistons move generally axially within the fuel manifold flowpath.

20. The fuel injector manifold of claim 10, wherein the fuel manifold flowpath extends circumferentially about the fuel manifold ring, and the one or more pistons move generally axially within the fuel manifold flowpath.

* * * * *